United States Patent [19]

Carlow et al.

[11] 4,145,751
[45] Mar. 20, 1979

[54] DATA DIRECTION REGISTER FOR INTERFACE ADAPTOR CHIP

[75] Inventors: Earl F. Carlow, Scottsdale, Ariz.; Wilbur L. Mathys, Norristown, Pa.; William D. Mensch, Norristown, Pa.; Charles Peddle, Norristown, Pa.; Michael F. Wiles, Phoenix, Ariz.

[73] Assignee: Motorola, Inc., Schaumburg, Ill.

[21] Appl. No.: 788,184

[22] Filed: Apr. 18, 1977

Related U.S. Application Data

[63] Continuation of Ser. No. 519,142, Oct. 30, 1974, abandoned.

[51] Int. Cl.² .................. G06F 3/04; G06F 13/00; G11C 9/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,348,209 | 10/1967 | Brooks | 364/900 |
| 3,408,632 | 10/1968 | Hauck | 364/900 |
| 3,413,612 | 11/1968 | Brooks et al. | 364/200 |
| 3,470,542 | 9/1969 | Trantanella | 364/200 X |
| 3,618,037 | 11/1971 | Wollum et al. | 364/200 |
| 3,675,209 | 7/1972 | Trost et al. | 364/200 |
| 3,693,161 | 9/1972 | Price et al. | 364/200 |
| 3,702,462 | 11/1972 | England | 364/200 |
| 3,702,988 | 11/1972 | Haney et al. | 364/200 |
| 3,737,861 | 6/1973 | O'Neill et al. | 364/200 |
| 3,757,306 | 9/1973 | Boone | 364/200 |
| 3,757,308 | 9/1973 | Fosdick | 364/200 |
| 3,815,099 | 6/1974 | Cohen et al. | 364/200 |
| 3,821,715 | 6/1974 | Hoff et al. | 364/200 |
| 3,909,791 | 10/1975 | Van Den Berg | 364/900 |
| 3,961,312 | 6/1976 | Bodner et al. | 364/200 |
| 3,962,682 | 6/1976 | Bennett et al. | 364/200 |
| 3,979,730 | 9/1976 | Bennett et al. | 364/200 |
| 4,003,283 | 1/1977 | Bennett et al. | 364/200 |
| 4,016,546 | 4/1977 | Bennett et al. | 364/200 |
| 4,017,840 | 4/1977 | Schild et al. | 364/200 |
| 4,069,510 | 1/1978 | Carlow et al. | 364/200 |

Primary Examiner—Gareth D. Shaw
Assistant Examiner—Jan E. Rhoads
Attorney, Agent, or Firm—Walter W. Nielsen

[57] ABSTRACT

The peripheral interface adaptor (PIA) circuit for data processing systems contains memory elements or control registers allowing modification under program control of the logical functions of the PIA.

A peripheral interface adaptor includes a plurality of data bus buffer circuits coupled to a bidirectional data bus and further includes peripheral interface buffer circuits coupled to a bidirectional peripheral system data bus. A direction of data flow at the peripheral interface data bus is controlled by a data direction register. Data from the data bus buffer is entered into an input register, and is transferred from there to an input bus coupled to the control register, a data direction register and a data register. Data from the peripheral data bus, the data direction register, and the control register are transferred via the output bus to the data bus buffers. Control signals are generated by select, read/write control, and register select logic which provides signals on a control bus coupled to the input register, the data register, and the data direction register to control data transfers between the various buses, registers, and buffer circuits.

5 Claims, 13 Drawing Figures

DATA DIRECTION REGISTER FOR INTERFACE ADAPTOR CHIP

RELATED APPLICATIONS

This application is a continuating of Ser. No. 519,142, filed Oct. 30, 1974, now abandoned.

This invention is related to the following patent applications filed simultaneously herewith and assigned to the assignee of this application: Ser. No. 519,150, now abandoned, by Bennett et al, entitled MICROPROCESSOR ARCHITECTURE: Ser. No. 519,138, now abandoned, by Bennett et al entitled INTERFACE ADAPTOR ARCHITECTURE; Ser. No. 519,149, now Pat. No. 3,942,055, by Bennett et al entitled MICROPROCESSOR SYSTEM; Ser. No. 519,131 now U.S. Pat. No. 3,979,730, by Bennett et al, entitled INTERFACE ADAPTOR HAVING CONTROL REGISTER; Ser. No. 519,132, now abandoned, by Bennett et al entitled MICROPROCESSOR CHIP BUS CONTROL SYSTEM; Ser. No. 519,133 now U.S. Pat. No. 4,004,281, by Bennett et al entitled MICROPROCESSOR CHIP REGISTER-BUS STRUCTURE; Ser. No. 519,134, now abandoned, by Bennett, et al entitled MICROPROCESSOR CHIP CIRCUITRY; Ser. No. 519,135, now abandoned, by Bennett et al entitled MICROPROCESSOR SYSTEM DATA BUS; Ser. No. 519,136 now U.S. Pat. No. 3,962,682, by Bennett et al entitled SPLIT LOW ORDER INTERNAL ADDRESS BUS FOR MICROPROCESSOR; Ser. No. 519,137, now U.S. Pat. No. 4,003,028, by Bennett et al entitled INTERRUPT CIRCUITRY FOR MICROPROCESSOR CHIP; Ser. No. 519,139 now U.S. Pat. No. 4,004,283, by Bennett et al entitled MULTIPLE INTERRUPT MICROPROCESSOR SYSTEM; Ser. No. 519,140 now U.S. Pat. 4,010,448, by Bennett et al entitled INTERRUPT CIRCUITRY FOR MICROPROCESSOR CHIP; Ser. No. 519,141, now abandoned, by Mathys et al entitled CONTROL REGISTER FOR INTERFACE ADAPTOR ADDRESS EXPANSION; Ser. No. 519,143, now abandoned, by Carlow et al entitled INTERRUPT STATUS REGISTER FOR INTERFACE ADAPTOR CHIP; Ser. No. 519,144, now abandoned, by Wiles entitled NON-MASKABLE INTERRUPT MICROPROCESSOR SYSTEM; Ser. No. 519,145, now abandoned, by Hepworth et al entitled MASTER-SLAVE CONTROL REGISTER FOR INTERFACE ADAPTOR CHIP; Ser. No. 519,146 now abandoned, by Bennett et al entitled MICROPROCESSOR SYSTEM INCLUDING PLURALITY OF CONTROLLER CHIPS.

BACKGROUND OF THE INVENTION

A major consideration in the design of microprocessor data processing systems is the system structure required for effective control of the various peripheral circuits being serviced and efficient data transfer to and from those peripheral circuits. In conventional data processing systems, the system structure associated with peripheral circuits usually has a high degree of specialized wiring and requires special purpose buffer circuits for interfacing between the peripheral circuits (which control peripheral devices controlled by the data processing system, such as displays, printers, keyboards, etc.) and the microprocessor data processing system. Various types of peripheral circuits usually have different requirements relative to the address selection of the peripheral circuit, the number of input pins, the number of output pins, and signal characteristics required for correct peripheral circuit operation. The use of special wiring and special purpose buffer circuits reduces the flexibility of the data processing system, since a change in the type of peripheral circuits interfacing with the data system may require that part of the system be rewired for the new circuit connection and that the section of the stored program associated with interfacing with the previous peripheral circuit be modified to suit the requirements of the new peripheral circuit. Recent development of compact and economical integrated circuit data systems involving a microprocessing unit (MPU) on a single chip has opened up broad areas of application where it was previously not feasible to use stored program digital data processing approaches. In many of the new application areas there are constraints which affect the design requirements of monolithic integrated circuits used to build MPU system. A MPU system may be required to interface with a wide variety of peripheral devices having many different electrical signal requirements for receiving and transmitting data. It is desirable that a standardized interconnecting scheme exist between an interface circuit and the MPU system such that wiring variations are not required for various system applications and a minimum number of wires and integrated circuit pins are used. MPU systems may be required to be capable of automatic operation such that an interruption in operation due to power supply failure or other system abnormalities can be overcome without manual intervention by an operator.

SUMMARY OF THE INVENTION

It is an object of this invention to provide a peripheral interface adaptor circuit whose logical functions may be modified under program control.

A further object of this invention is to provide a peripheral interface adaptor circuit having a reduced number of external connections thereto.

A further object of this invention is to provide a peripheral interface adaptor circuit containing a register and signal direction defining logic elements such that the number of data channels connectable to peripheral devices and the direction of data flow to and from the peripheral devices be modified under program control.

Briefly described, the invention is a peripheral interface adaptor, which in a preferred embodiment fabricated on an MOS integrated circuit chip, includes a first bidirectional buffer circuit adapted to be coupled to a data system and a second data bus, which may be bidirectional, adapted to be coupled to a peripheral device. The peripheral interface adaptor includes input logic circuity coupled to the first bus and output logic circuitry coupled to the second bus. Transfer of data between the first and second buses is accomplished under the control of control logic circuitry coupled to the input logic circuitry and the output logic circuitry. A logical function of the control logic circuitry is controlled under program control by control register circuitry coupled to the control logic circuitry. A data direction register is coupled to the peripheral data bus buffer, the output bus and the control bus to the control register for storing information which controls direction of data transfer at said peripheral data bus buffer.

BRIEF DESCRIPTION OF THE DRAWINGS

FIG. 3I shows part of the chip select and Read/Write control circuitry.

DETAILED DESCRIPTION OF THE INVENTION

This application describes a peripheral interface adaptor (PIA) logic circuit which makes use of a digital logic organization to provide a solution to the problems associated with interfacing a bus-organized data processing system to a variety of data peripheral units having varying logical and electrical interfacing requirements.

The essence of the digital organization is to provide a special element, referred to herein as a control register for the storage of information which determines the function of control logic of the peripheral interface adaptor circuit, referred to herein as a PIA circuit.

Figure 1:
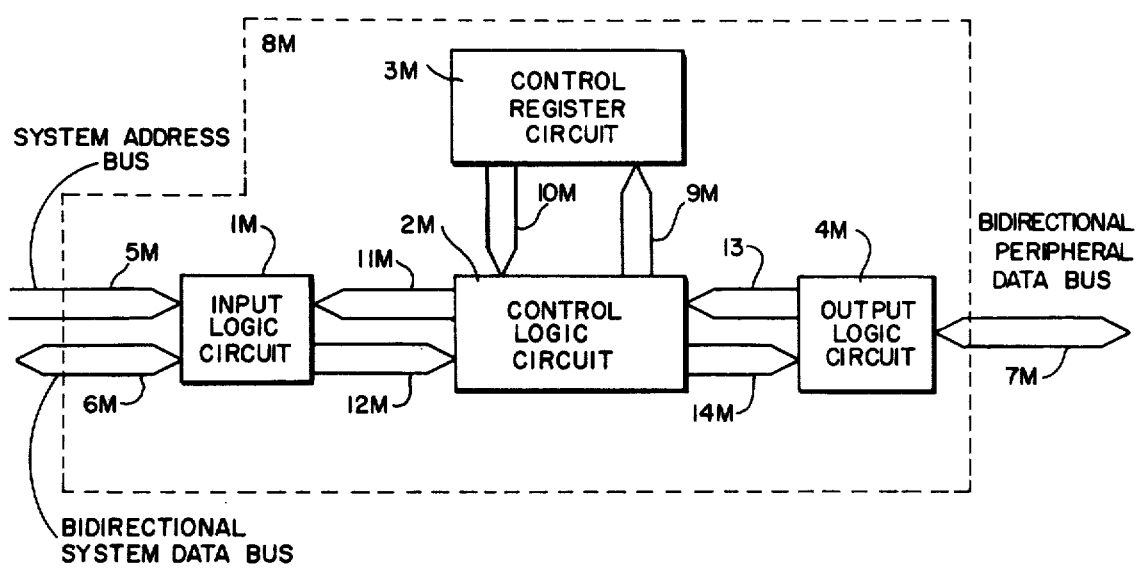
FIG. 1 is a general block diagram showing a control register logic organization.

FIG. 1 illustrates a general block diagram of a PIA. PIA 8M is structured to have connections to a data processing system (not shown) via a system address bus 5M and a bidirectional system data bus 6M. These buses are connected to the input logic circuit 1M. This input logic circuit contains address selection circuitry which determines when the PIA is selected and data input logic and memory circuitry for receiving data from the system data bus, providing temporary storage for the data and routing it to other logic elements within the PIA. The routing of data to and from the input logic is performed under the control of the control logic circuit 2M.

The control logic circuit 2M has the ability to transmit specified data from the data processing system to the control register circuit 3M via data path 9M. Once this information is stored in the control register it can feed back logic information via the data path 10M. This logic state information can be used to change the logic structure of the control logic circuit 2M such that data contents of the control register 3M will change the combinatortial or sequential logic functions of the control logic. Thus, use of the control register allows a restructuring of the logic functions of the PIA circuit under program control, since the data processing system program can be used to transmit the required sequence of data to the PIA circuit via the data processing systems data bus 6M. Control logic circuit 2M also transmits and receives data from output logic circuit 4M via data paths 13M and 14M. The output logic circuit 4M contains the interface circuitry and temporary buffer storage required for interconnection to external peripheral devices (not shown) required to communicate with the data processing system. This interconnection is via the bidirectional peripheral data bus 7M.

An instruction set of the data processing system allows the control register storage and the resultant restructuring of the PIA logic to be accomplished under program control both during system "initialization" sequences and during various times throughout the normal data transfer sequence of a given peripheral unit. The restructuring of the PIA logic structure according to this concept provides broad flexibility to a data system designer. For example, this concept allows address expansion relative to the selection of peripheral devices for peripheral input-output (I/O) lines since portions of the information stored in the control register can be assigned to the definition of expanded address locations of other registers within the control portion of the PIA. Similarly, the structure of the PIA control logic can be altered at will be the programmer both in terms of its combinatorial logic characteristics and its sequential logic characteristics as required by the sequence of events associated with some particular combination of peripherals. For example, the peripheral interface pins (external lead connections) of the PIA can be redefined as output-directed pins or input-directed pins at any time the programmer desires. There exist a large number of possibilities for control of functions of a concept.

In recently developed microprocessing systems which are implemented using a family of monolithic integrated circuits, circuits must be provided to interface with the peripheral which a microprocessor chip (MPU) is to service. A PIA chip specifically designed to meet this requirement in a recently developed microprocessing system is discussed hereinafter.

The PIA provides means of interfacing a wide variety of peripheral equipment to a microprocessor unit (MPU). This preferred embodiment is capable of interfacing the MPU to peripherals through two eight-bit bidirectional peripheral data buses and four control lines. No external logic is required for interfacing to most peripheral devices. A complete description of a suitable microprocessor unit, the Motorola MC6800, is set forth in Ser. No. 519,136, now U.S. Pat. No. 3,962,682, filed on the same date as this application. A description of an operation of the MC6800 and the interface adaptor of this application is set forth in Ser. No. 519,139, now U.S. Pat. No. 4,003,283, filed on the same date as this application. Both of the foregoing patents are incorporated herein by reference.

The functional configuration of the PIA is programmed by the MPU during system operation. Each of the peripheral data lines can be programmed to act as an input or output, and each of the four control/interrupt lines may be programmed for one of several control modes. This allows a high degree of flexibility in the over-all operation of the interface.

Figure 2:
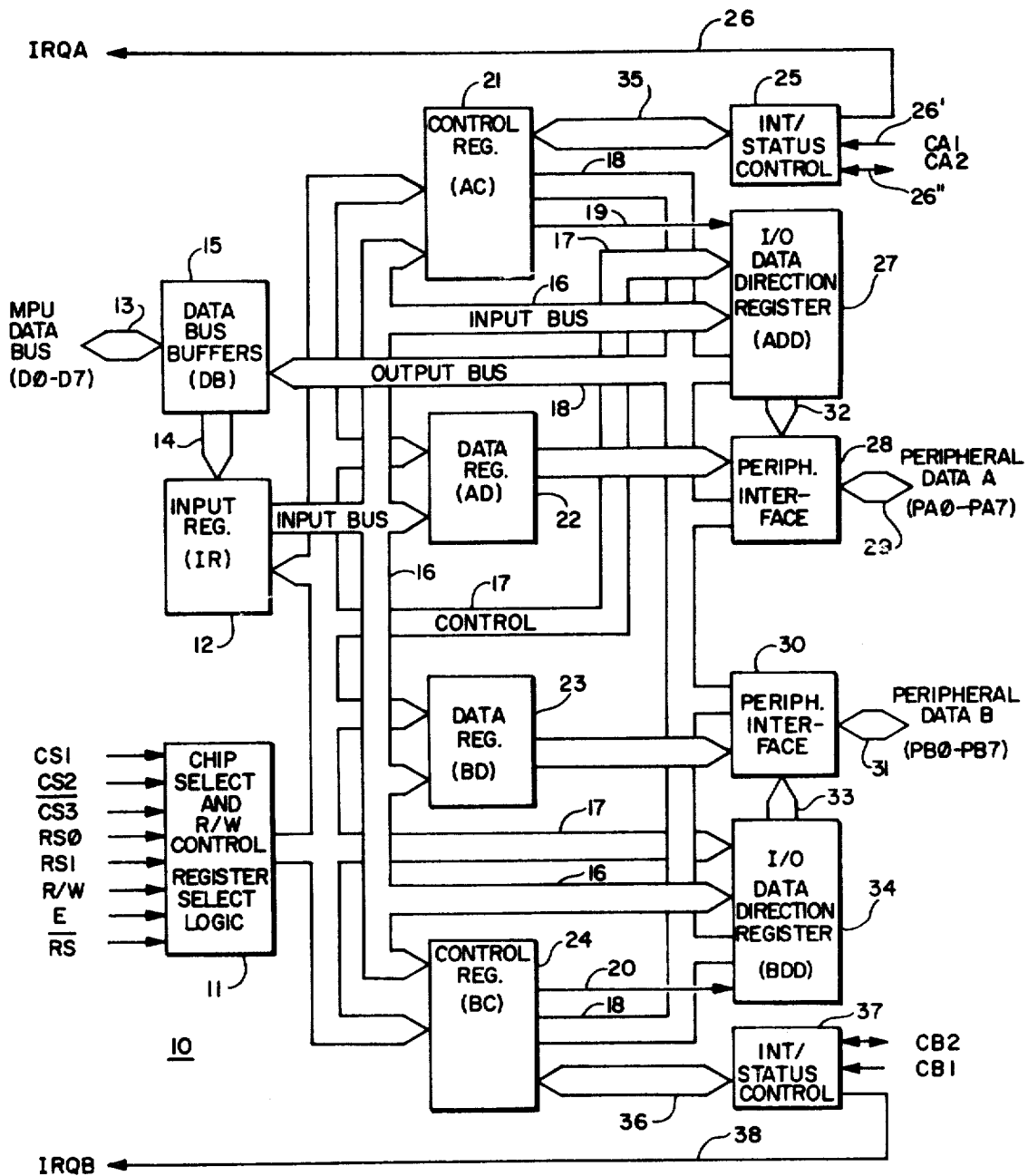
FIG. 2 is a detailed block diagram of a PIA showing all functional elements and their interconnection.

FIG. 2 is a block diagram of a preferred embodiment of the PIA according to the invention. The PIA 10 includes control circuitry, a plurality of registers, data buffer circuitry, peripheral interface circuitry, and three internal buses (an input bus, an output bus, and a control bus) and a MPU data bus (D$\phi$–D7), and peripheral data bus A (PA$\phi$–PA7), and peripheral data bus B (PB$\phi$–PB7). The input bus and the output bus each include a plurality of conductors. The control bus includes a plurality of control signal conductors which "enable" coupling circuitry between the various buses and registers.

Peripheral interface adaptor 10 includes MPU data bus 13 and eight data bus buffer circuits 15. Data bus buffer circuitry 15 is coupled to output bus 18 and is coupled by means of conductors 14 to input register 12, which is coupled to input bus 16 and control conductors 17. Control bus conductors 17 are coupled to and controlled by chip select and Read/Write control circuitry 11, which has as its inputs the conductors designated CS1 (chip select 1), CS2, $\overline{CS3}$, RS$\phi$ (register select,) RS1, R/W (Read/Write), E (Enable), and RS ($\overline{reset}$). Peripheral interface adaptor 10 also includes control registers 21 and 24, each of which are coupled to input bus 16, output bus 18 and certain of the control conductors 17. Control register 21 is coupled by means of conductors 35 to interrupt/status control circuitry 25 which is coupled to conductors 26, designated IRQA and to conductors 26' and 26" designated CA1 and CA2, respectively. IRQA is an abbreviation for interrupt request for register section A. Control register 21 is also coupled by conductor 19 to I/O (input/output) control register 27. I/O control register 27 is also coupled to output bus 18, input bus 16 and control conductors 17, and is coupled by means of conductors 32 to the peripheral interface buffers 28, which are respectively connected to the conductors of peripheral data register 22 and output bus 18. Data register 22 is also coupled to control conductors 17 and input bus 16.

Control register 24, data register 23, peripheral interface buffer circuitry 30, I/O control register 34, and interrupt/status control circuitry 37 are interconnected in a manner entirely similar to the corresponding sections described above. Data register 23 is coupled to input bus 16, control conductor 17, and is connected to the peripheral interface of circuitry 30, which in turn is coupled to external peripheral data bus conductors B designated by reference numeral 31, and to output bus 18 and to I/O control register 34. I/O control register 34 is coupled to certain control conductors 17, input bus 16, and output bus 18. Control register 24 is coupled to input bus 16, certain of control conductors of control bus 17, output bus 18, and conductor 20, the latter being coupled also to I/O control register 34. Control register 24 is also coupled by means of conductors 36 to interrupt/status control circuitry 37, which is connected to conductors CB1, CB2, and IRQB conductor 38.

When the PIA circuit shown in FIG. 2 is provided necessary address, data, control and timing interconnections to a MPU and is connected to one or more peripheral units, the resulting capability for functional operation, modifiable under program control, meets the needs of a wide variety of different peripheral devices (i.e., display units, keyboards, industrial process control equipment, etc). The definition of allowable configurations and the internal control established by the functional elements of FIG. 2 are described in the following discussion. The nomenclature used to refer to detailed elements within the structure such as register stages, internal signal lines, etc. are shown in the detailed logic diagrams of FIGS. 3A-3K.

There are six locations within the PIA accessible to the MPU data bus including two peripheral interface buffers 28, 30, two I/O control registers 27, 34, and two control registers 21, 24. Selection of these locations is controlled by the RS$\phi$ and RS1 inputs together with bit 2 in the appropriate control register, as shown in Table 1.

A reset pulse applied to the $\overline{RS}$ input has the effect of zeroing all PIA registers. This will set PA$\phi$-PA7, PB$\phi$-PB7, CA2 and CB2 as inputs, and all interrupts disabled. The PIA must be configured during the restart program which follows the reset pulse. Details of possible configurations of the I/O data direction registers 27 and 34, also designated ADD and BDD, respectively, and A or B control registers 21 and 24, respectively, are as follows.

The two I/O data direction registers allow the MPU to control the direction of data through each corresponding peripheral data line. A data direction register bit set to a logical "0" configures the corresponding peripheral data line as an input; a "1" causes the peripheral data line to act as an output.

The two control registers AC and BC allow the MPU to control the operation of the four peripheral control lines CA1, CA2, CB1 and CB2. In addition they allow the MPU to enable the interrupt flags. Bits $\phi$ through 5 of the two registers may be written or read by the MPU when the proper chip select and register select signals are applied. Bits 6 and 7 of the two registers are read only and are modified by external interrupts occurring on control lines CA1, CA2, CB1 or CB2. The bit format of A and B control registers is shown in Table 2.

The functional definition of control register bits is as follows. Bit 2 in each control register AC and BC allows selection of either a peripheral interface register or the I/O control register when the proper register select signals are applied to RS$\phi$ and RS1. The forced interrupt flag bits AC-6, AC-7, BC-6, and BC-7 are set by active transitions of signals on the four interrupt/peripheral status lines when those lines are programmed to be interrupt inputs. These bits cannot be set directly from the MPU data bus and are reset indirectly by a MPU "Read Peripheral Data" operation on the appropriate section. The two lowest order bits of the control registers are used to control the interrupt input lines CA1 and CB1. Bits AC-$\phi$ and BC-$\phi$ are used to enable the MPU interrupt signals IRQA and IRQS, respectively. Bits AC-1 and AB1 determine the active transition of the interrupt input signals CA1 and CB1. The definition of these transitions together with the other functional requirements for interrupt inputs CA1 and CB1 are shown in Table 3.

Bits AC-3, AC-4, AC-5, BC, BC-4, and BC-5 of the two control registers AC and BC are used to control the CA2 and CB2 Peripheral control lines. These bits determine if the control lines will be an interrupt input or an output control signal. If bit AC-5 (BC-5) is low, CA2 (CB2) is an interrupt input line with functional requirements similar to CA1 (CB1) as shown in (Table 4). When AC-5 (BC-5) is high, CA2 (CB2) becomes an output signal that may be used to control peripheral data transfers. When in the output mode, CA2 and CB2 have slightly different characteristics as defined in Tables 5 and 6, respectively. When in the output mode, the low state of CA2 (CB2) is established by an MPU read or write operation, while the high state may be determined by an active transition of CA1 (CB1), and E pulse transition, or by an MPU write operation.

FIG. 2 also shows the various external electrical signal lines required. These signal lines fall into either the PIA to MPU category or the PIA to peripheral unit category and operate as follows. The PIA interfaces to the MPU with an eight-bit bidirectional data bus, three clip select lines, two register select lines, two interrupt request lines, a read/write (R/W) line, an enable line and a reset line. These signals permit the MPU to have complete control over the PIA. The bidirectional data lines (D$\phi$-D7) allow the transfer of data between the MPU and the PIA. The data bus output drivers are three-state devices that remain in the high-impedance (off) state except when the MPU performs a PIA read operation. The read/write line is in the read (high) state when the PIA is selected for a read operation.

The enable pulse, E, is the only timing signal that is supplied to the PIA. Timing of all other signals is referenced to the leading and trailing edges of the E pulse. In normal operation with the MPU this input is a MPU "valid memory address" signal (designated VMA) ANDed with the phase two clock (VMA.$\phi$2). This PIA Read/Write (R/W) signal is generated by the MPU to control the direction of data transfers on the data bus. A low state on the PIA R/W line enables the input buffers and data is transferred from the MPU to the PIA on the E signal if the device has been selected. A high on the R/W line sets up the PIA for a transfer of data to the bus. The PIA output buffers are enabled when the proper address and the enable pulse E are present.

The active low $\overline{RS}$ line is used to reset all register bits in the PIA to a logical zero (low). This line can be used as a power-on reset and as a master reset during system operation.

The three PIA chip select input signals CS, CS1 and $\overline{CS2}$, are used to select the PIA. CS0 and CS1 must be high and $\overline{CS2}$ must be low for selection of the device. Data transfers are then performed under the control of the enable and read/write signals. The chip select lines must be stable for the duration of the E pulse.

The two register select lines RS$\phi$ and RS1 are used to select the various registers inside the PIA. These two lines are used in conjunction with internal control registers to select a particular register that is to be written or read. The register select lines should be stable for the duration of the E pulse while in a read or write cycle.

The active low interrupt request lines ($\overline{IRQA}$ and $\overline{IRQB}$) act to interrupt the MPU either directly or through interrupt priority circuitry. These lines are "open source" (no load device on the chip) and are capable of sinking a current of 1.6 mA from an external source. This permits all interrupt request lines to be tied together in a wire-Or configuration.

Each peripheral interrupt line has two internal interrupt flag bits that will cause the appropriate interrupt request line (IRQA to IRQB) to go low. Each flag bit is associated with a particular peripheral interrupt line. Also four interrupt enable bitsd are provided in the PIA which may be used to inhibit a particular interrupt from a peripheral device. Servicing an interrupt by the MPU is accomplished by a software routine that, on a prioritized basis, sequentially reads and tests the two control registers in each PIA for interrupt flag bits that are set. The interrupt flag is cleared (zeroed) as a result of an MPU "read peripheral data" operation.

The PIA provides two 8-bit bi-directional data buses and four interrupt/control lines for interfacing to peripheral devices.

Each of the peripheral data lines of Section A can be programmed to act as an input or output. This is accomplished by setting a "1" in the corresponding I/O data direction register bit for those lines which are to be output. A "0" in a bit of the I/O data direction register causes the corresponding peripheral data line to act as an input. During an MPU "read peripheral data" operation, the data on peripheral lines programmed to act as inputs appears directly on the corresponding MPU data bus lines.

The data in peripheral interface register A will appear on the data lines that are programmed to be outputs. A logical "1" written into the register will cause a "high" on the corresponding data line while a "0" results in a "low". Data in peripheral interface register A may be read by an MPU "read peripheral data A" operation when the corresponding lines are programmed as outputs.

The peripheral data lines PB$\phi$-PB7 in the B Section of the PIA can be programmed to act as either inputs or outputs in a similar manner to PA$\phi$-PA7. However, the output buffers driving these lines differ from those driving lines PA$\phi$-PA7. They have a three-state capability, which allows them to be switched to a high-impedance state when the peripheral data line is used an input.

Peripheral input lines CA1 and CB1 are input only lines that set the interrupt flags of the control registers. The active transition for these signals is also programmed by the two control registers.

The peripheral control line CA2 can be programmed to act as an interrupt input or as a peripheral control output. The function of this signal line as an input or an output is programmed with control register A as shown in Tables 4 and 6.

Peripheral control line CB2 may also be programmed to act as an interrupt input or peripheral control output. The function of this signal line as an input or an output is programmed by control register B as shown in Tables 4 and 5.

FIGS. 3A through 3K show the detailed logic structure of the functional elements shown in the block diagram of FIG. 2.

Figure 3A:
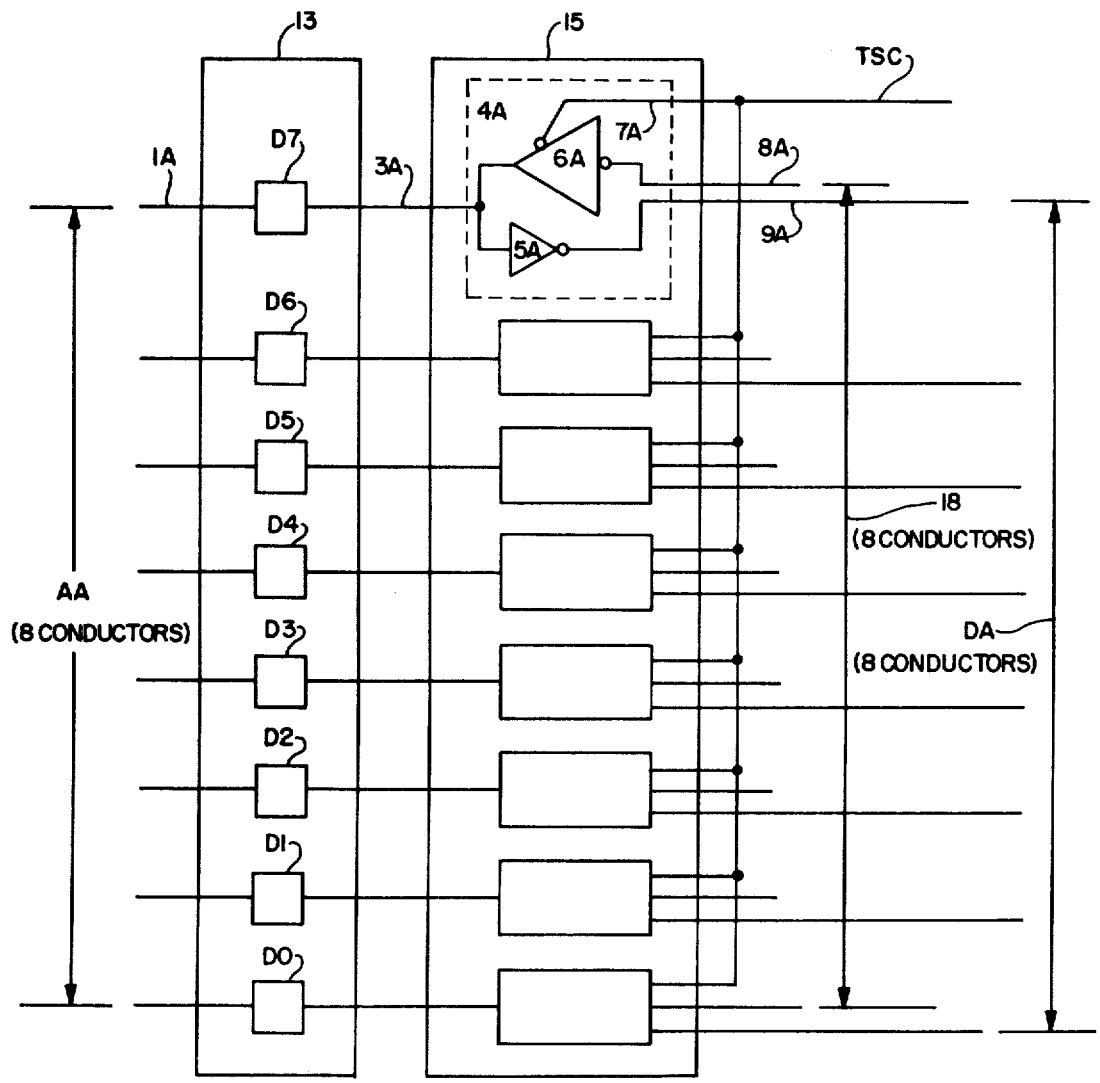
FIGS. 3A–3H are the portions of a complete logic diagram of a peripheral interface adaptor circuit according to the invention.

FIG. 3A shows the MPU data bus 13 and the data bus buffers 15 which function to allow the bidirectional transfer of data between the MPU and the PIA. The data bus conductors from the MPU system AA are connected to MPU data bus 13. MPU data bus 13 includes the eight bonding pads and conductors D$\phi$-D7. For each there is a conducting path like that shown by the input conductor 1A connected to the integrated circuit pad D7 connected to the output conductor 3A which couples to the data bus buffer circuit. The data bus buffer circuit 15 consists of eight identical circuit blocks 4A, each of which contain receiving inverter 5A which receives data from conductor 3A and re-transmits it via conductor 9A and a transmitting inverter 6A which receives data via conductor 8A and transmits it to the MPU system via conductor 3A. Each of the receiving inverters 6A also are fed by a three-state control line 7A, which can force the output of 6A into a high impedance state. Each buffer will stay in a high-impedance input mode except when the PIA has received the proper set of signals for a MPU read operation. The three-state control 7A for each of the eight buffer circuits are connected together to form the three-state control line TSC which is coupled to circuitry shown in FIG. 3I. The conductor 9A for each data buffer form the eight conductors DA which are connected to the input register shown in FIG. 3B. The conductor 8A which is connected to each buffer circuit form the eight conductor data bus 18 which is connected to the register circuitry in FIGS. 3B, 3C, 3D, and 3E.

Figure 3B:
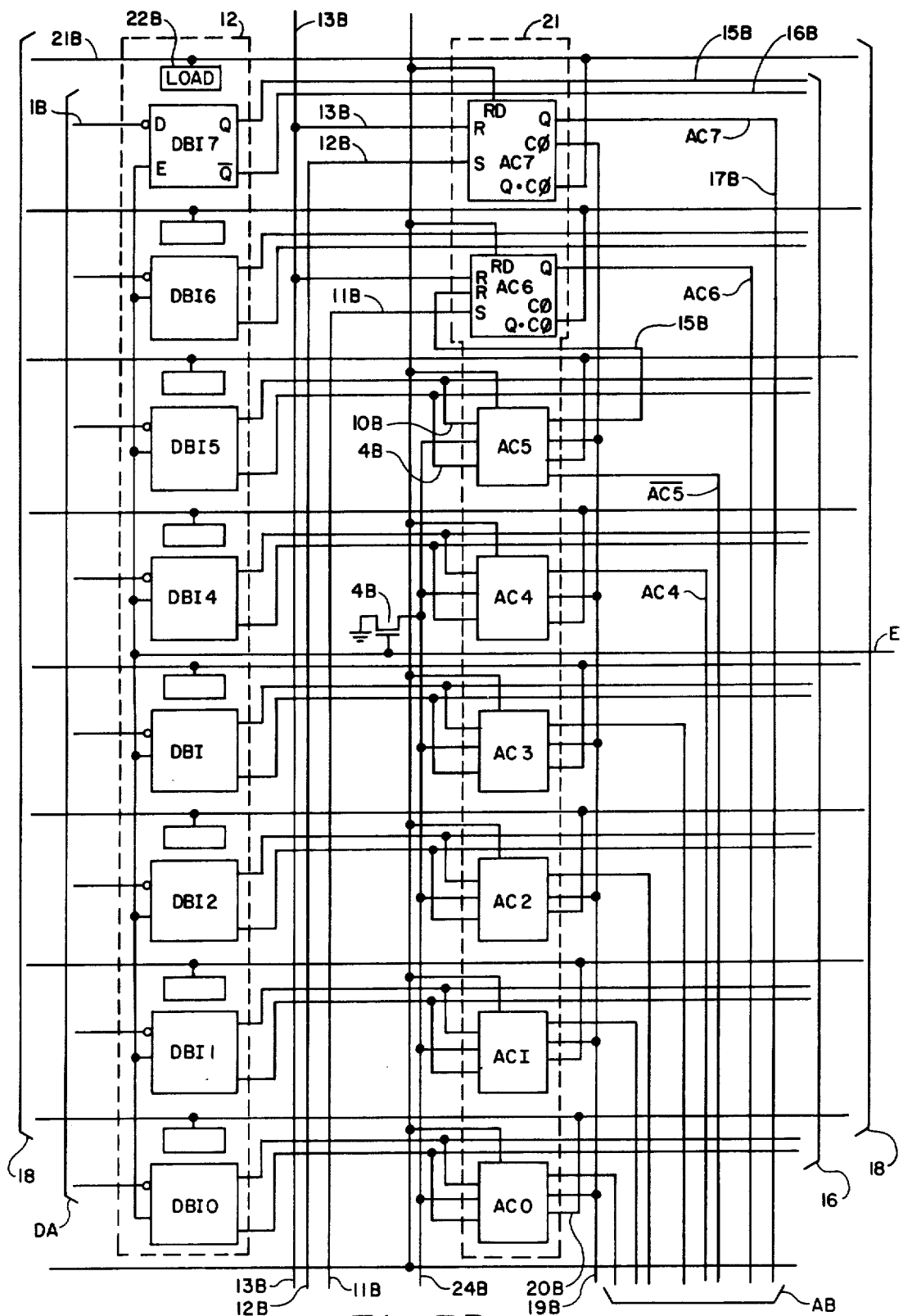

FIG. 3B shows the input register 12 and the A control register 21. The function of the A control register 21 is to allow the MPU to control the operation of the peripheral control lines CA1 and CA2 and to enable and monitor interrupt signals. The A control register 21 also contains one bit (AC2) which controls the access to the A data direction register ADD. The input register 12 consists of eight identical register stages DBI$\phi$-DBI7. Each register stage has a data input conductor 1B from the eight conductor group, DA. Each register stage has a clock input which connects to the common clock line 23B which connects to the CS and R/W control logic circuit 11 shown in FIG. 3K. Each input register stage DBIφ–DBI7 has a conductor 15B connected to its output and a conductor 16B connected to its complementary output. These eight pairs of conductors form the input bus 16 which transmits data to other registers of the PIA circuit.

Control register 21 consists of eight register stages ACφ–AC7. Register stage AC6 has a "SET" input 11B and register stage AC7 has a "SET" input 12B, which is connected to interrupt/status control circuitry 25, shown in FIG. 3K. Register stages AC6 and AC7 have a common "reset" input 13B from the chip select and Read/Write control circuit 11 shown in FIG. 3I. Register stage A6 also has a second "reset" input 15B which is connected to a non-complimentary output of register stage AC5. The remaining six register stages ACφ–AC5 each have a SET input 10B which is the uncomplimented output of the corresponding input register stage and a "reset" input 9B connected to the complimented output of the corresponding input register stage. The function of control register 24 is to allow the MPU to control the operation of the peripheral control lines CB1 and CB2 and to enable and monitor interrupts. Control register 24 also contains one stage (CB2) which controls the access to BDD. The complimentary output of register bit AC5 connects to conductor AC5. The non-complimentary output of the other seven register stages connect to conductors ACφ–AC4, and AC6 and AC7 to form the eight conductor group AB which is part of the interconnection 35 to the A interrupt/status control circuit 25, shown in FIG. 3J.

Figure 3C:
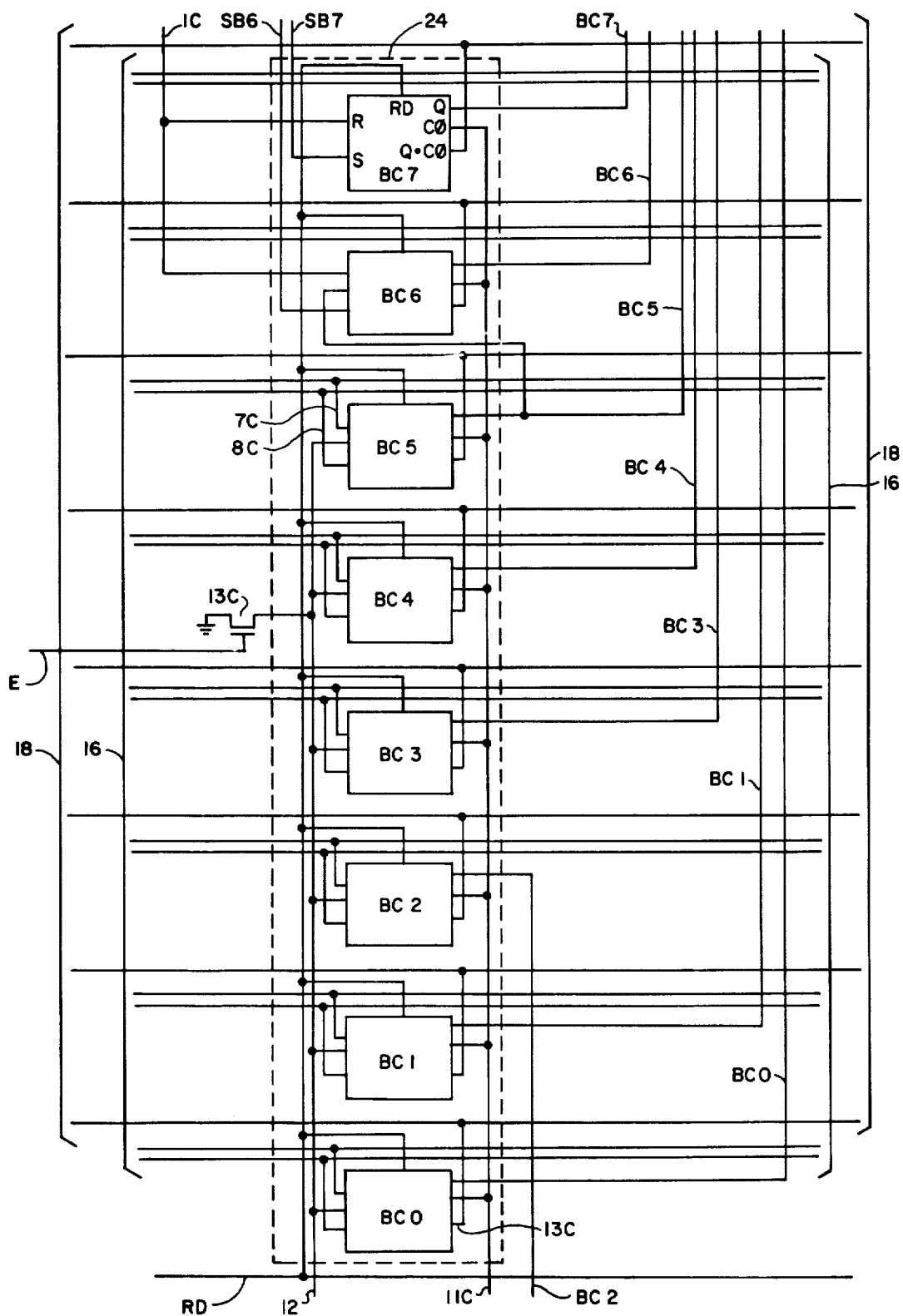
Figure 3D:
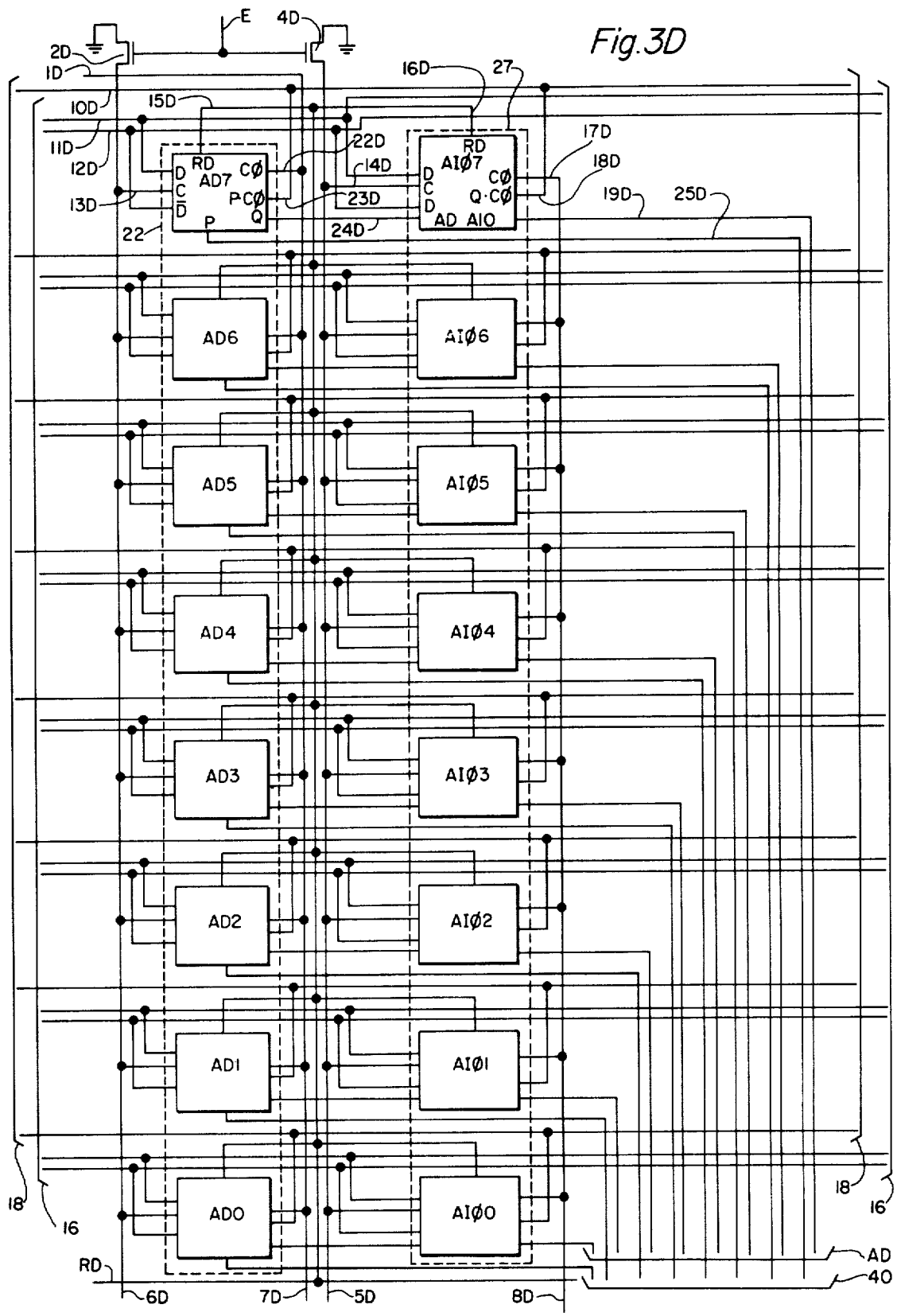
Figure 3E:
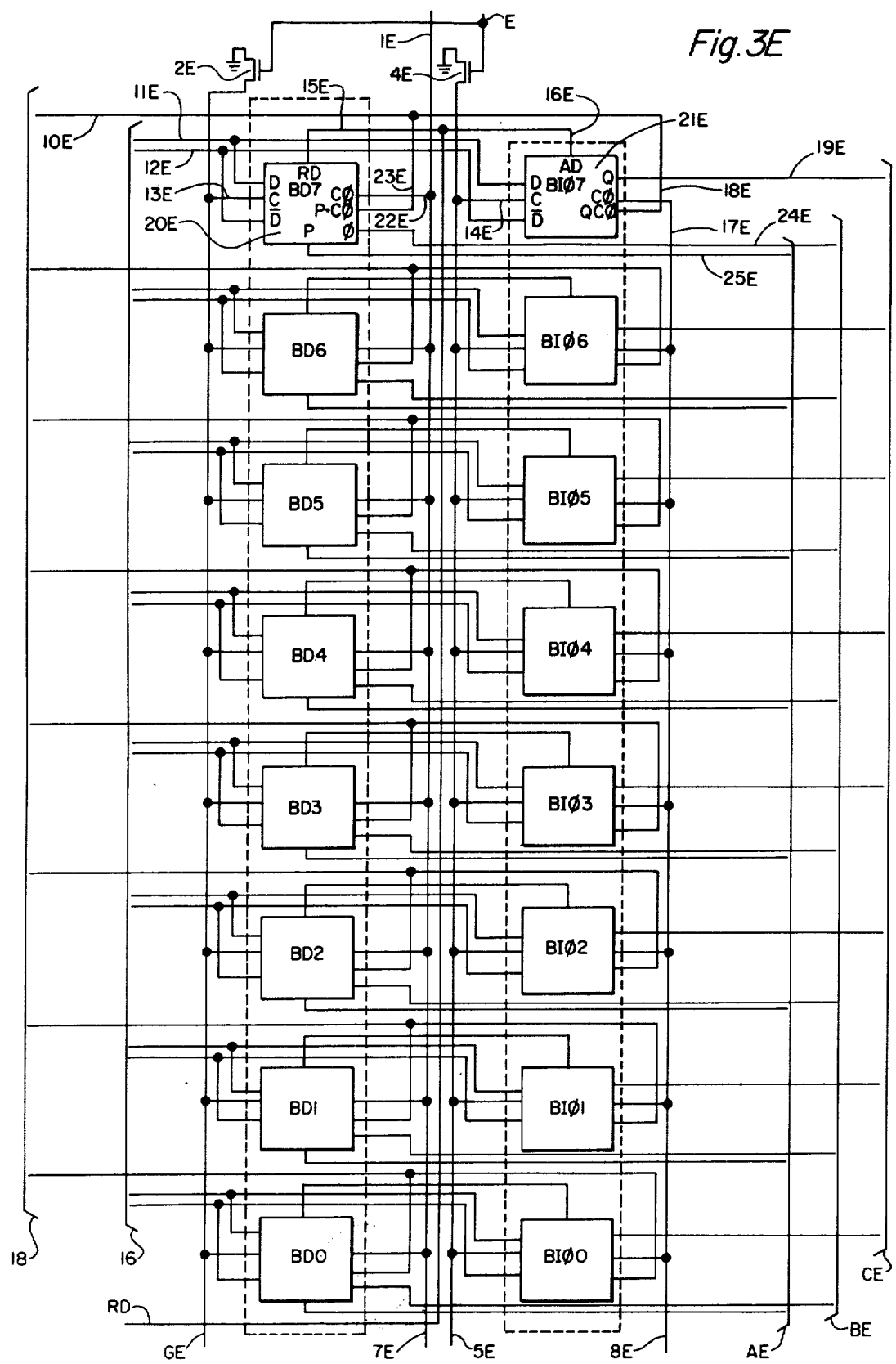
Figure 3F:
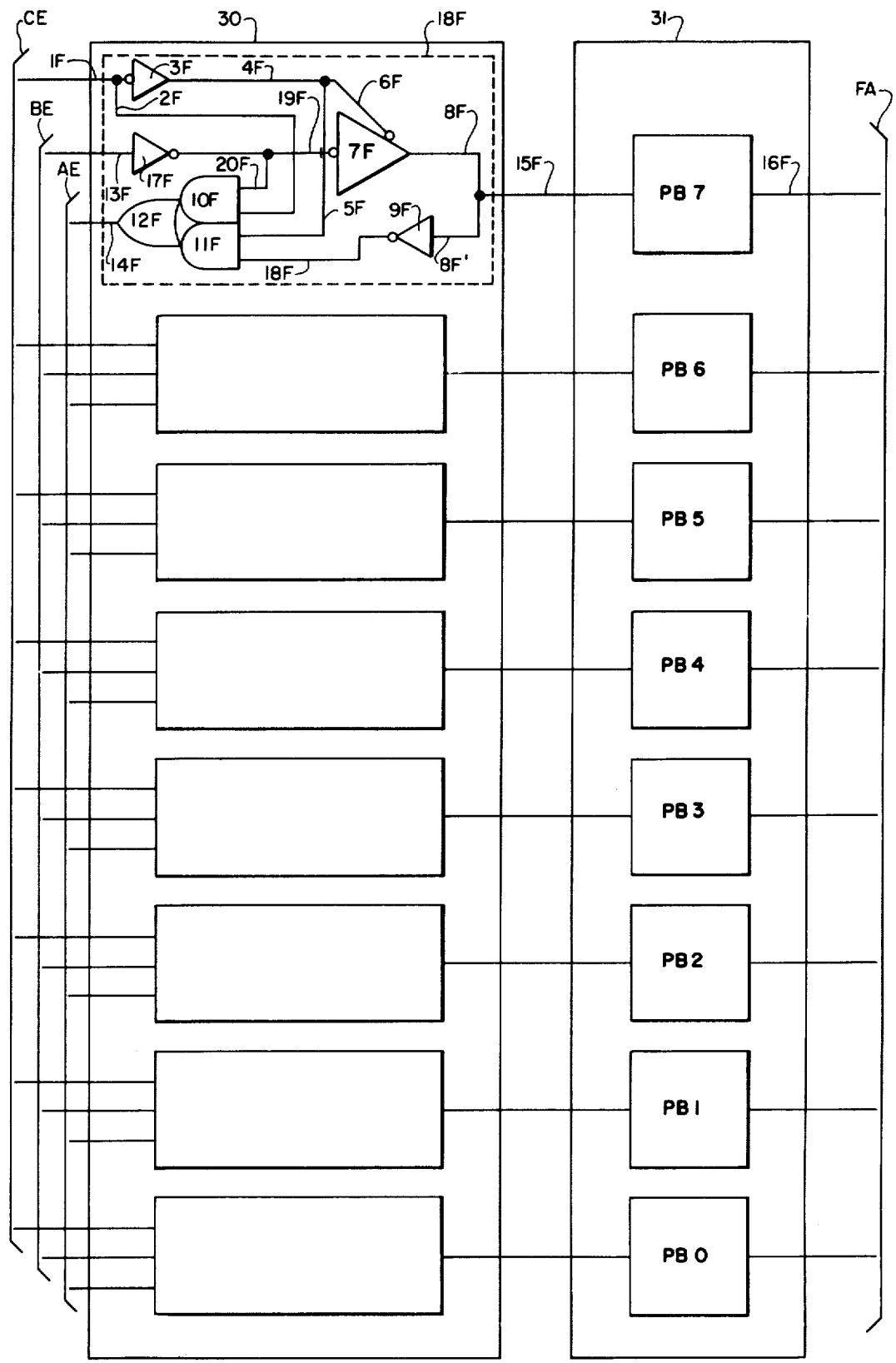
Figure 3G:
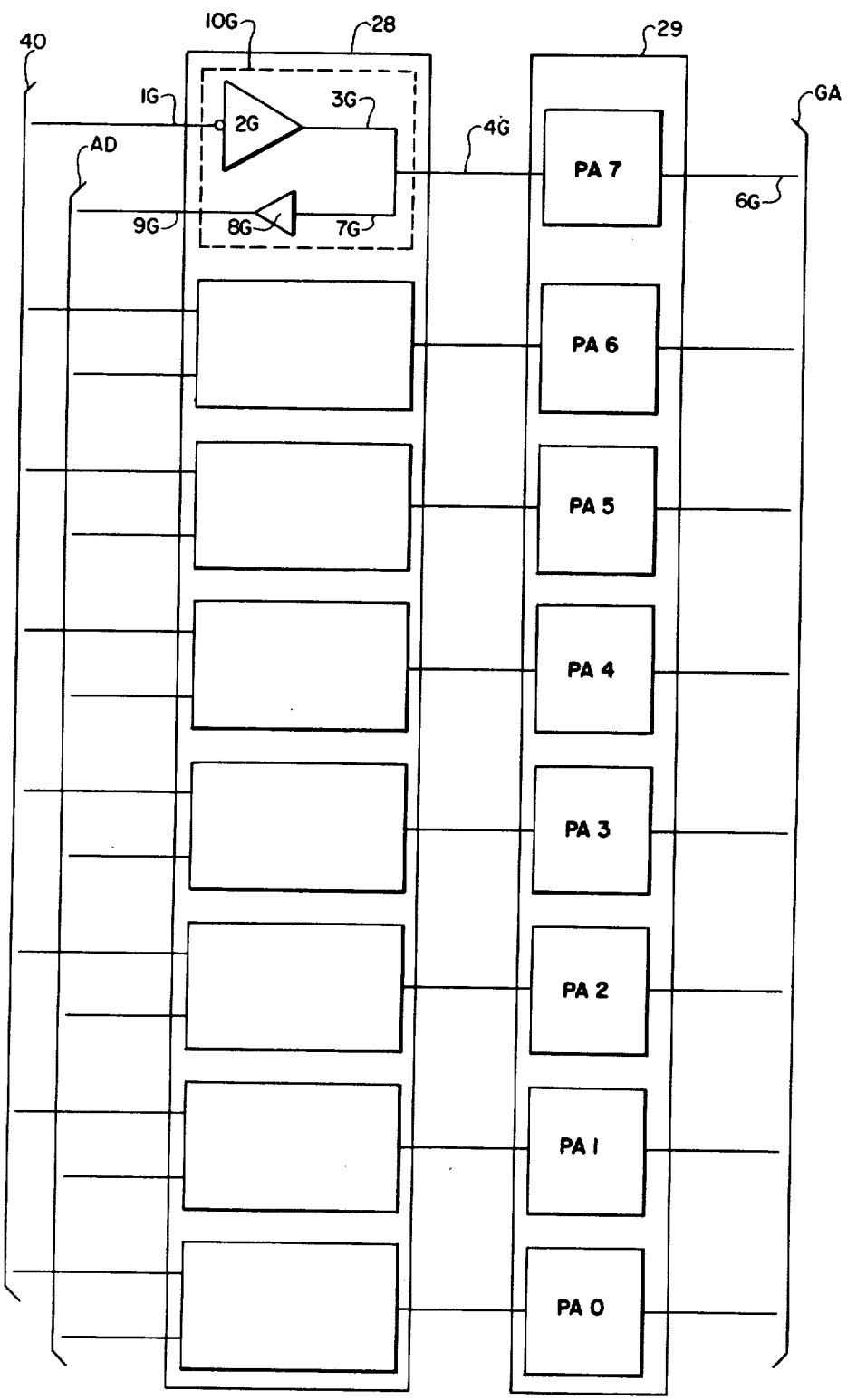
Figure 3H:
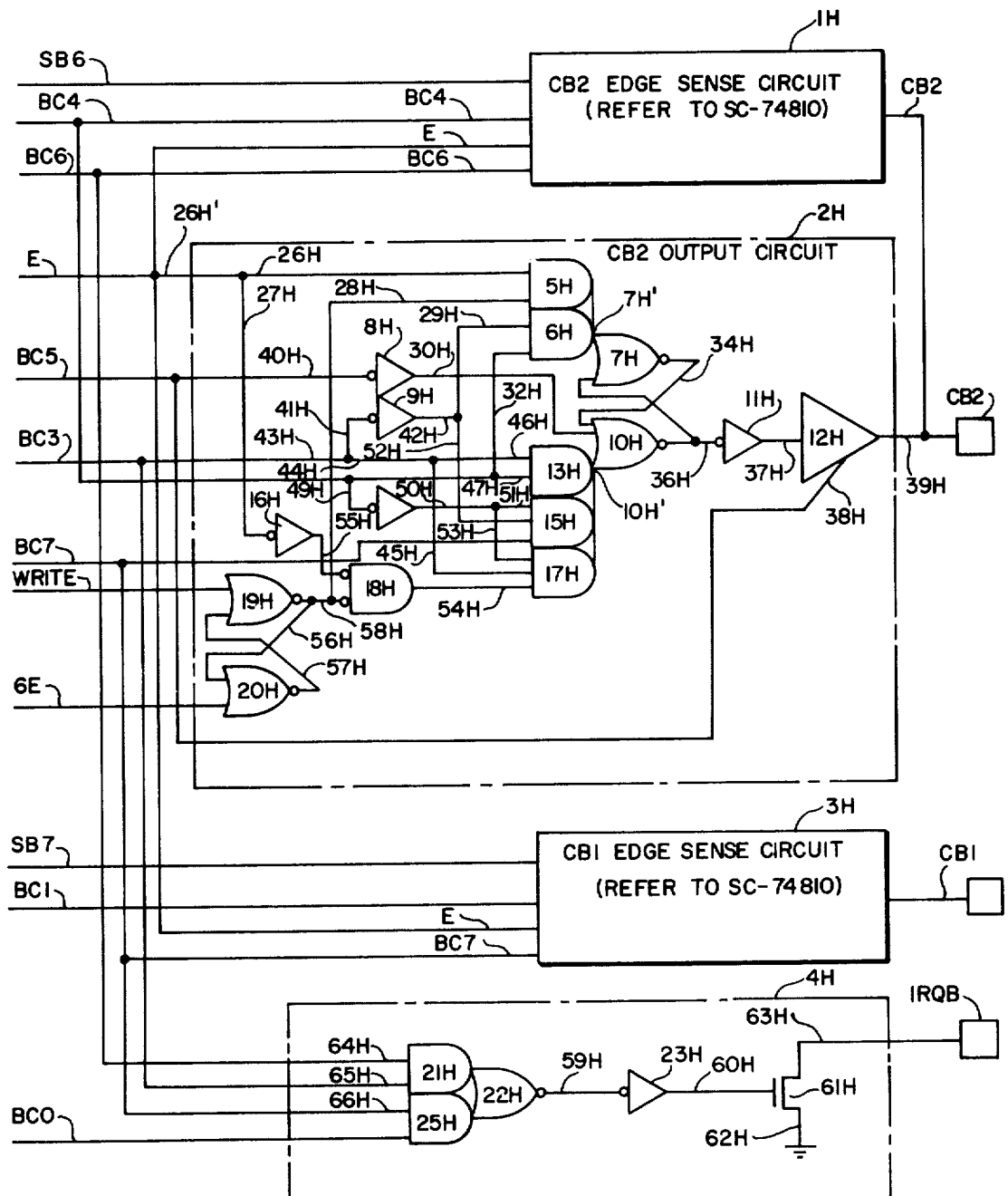
Figure 31:
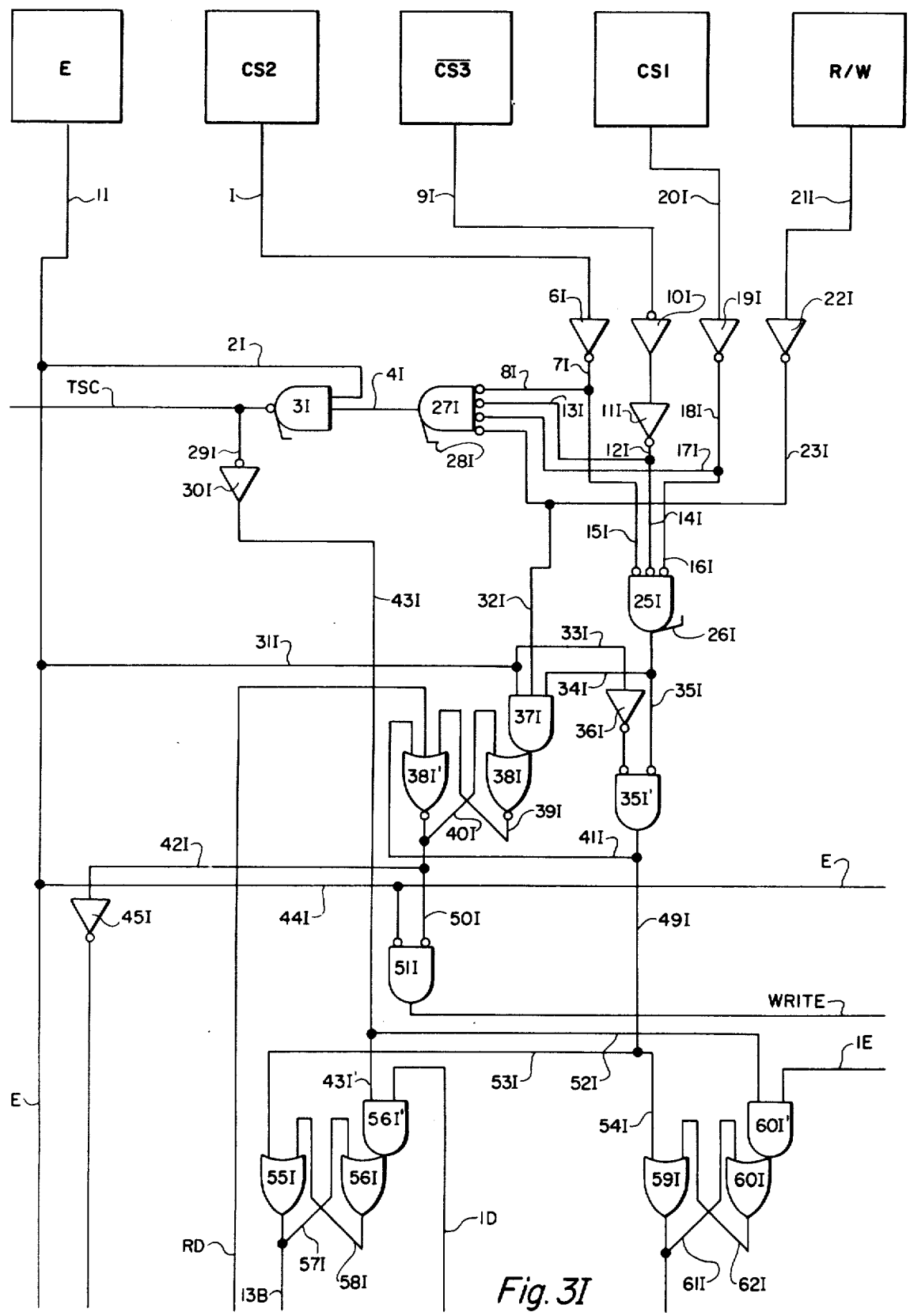
Figure 3J:
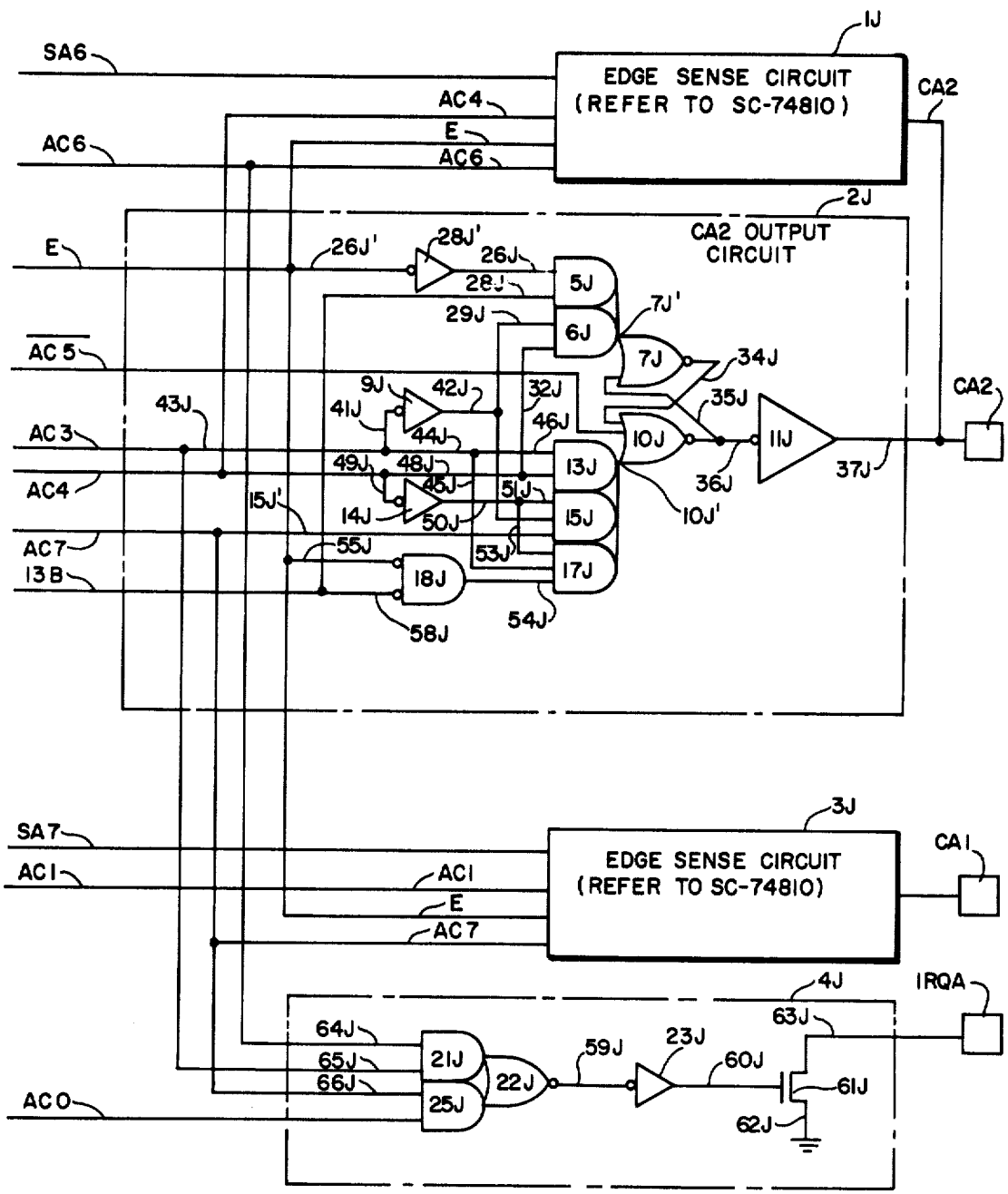
FIG. 3J shows A interrupt/status control logic circuitry.
Figure 3K:
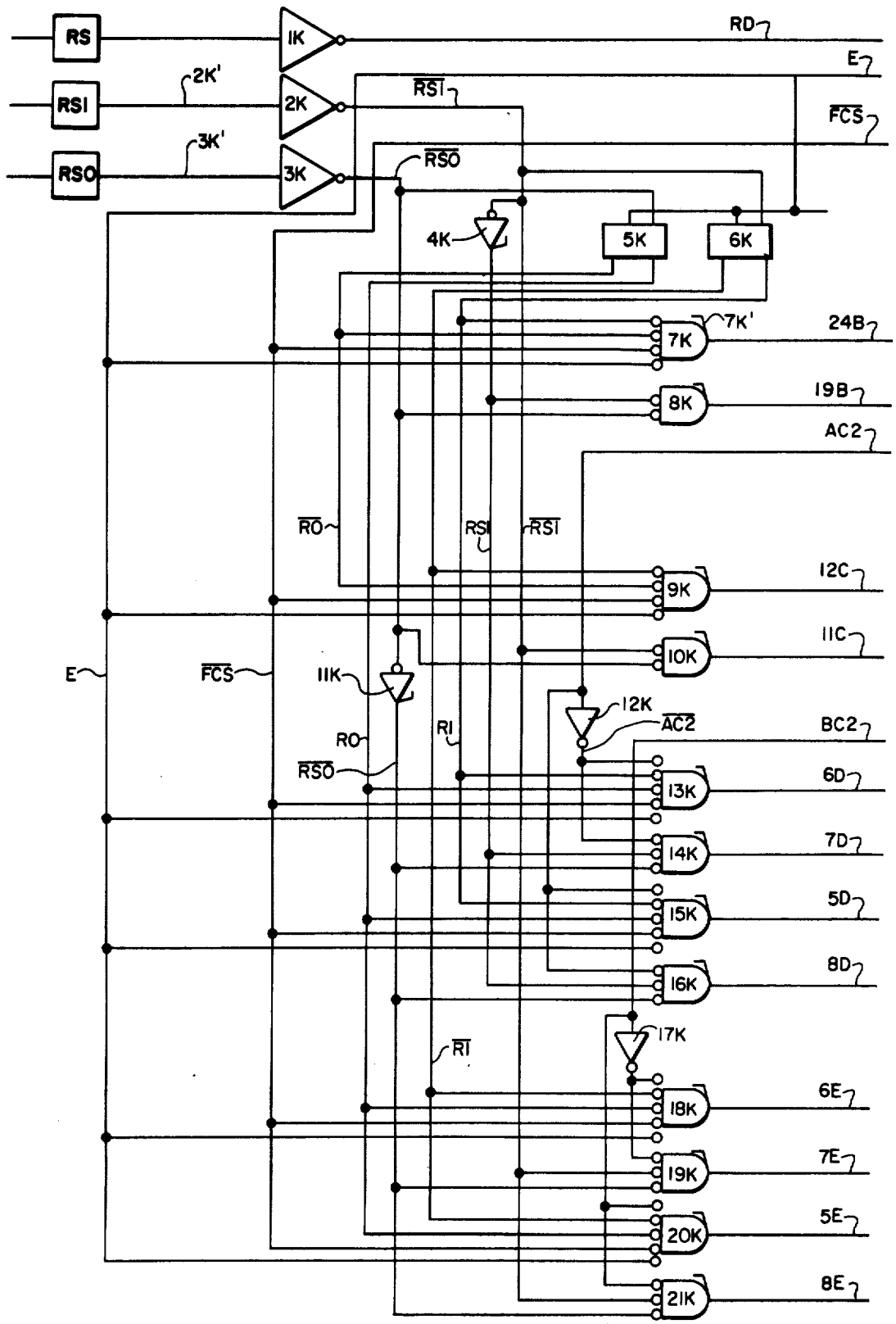
FIG. 3K shows part of the chip select and Read/-Write control logic circuitry.

The eight A control register stages all connect to a common "master reset" conductor RD from the chip select and Read/Write control logic 11 shown in FIG. 3K. All eight control register stages are connected to an output clock conductor 19B which couples to the register select logic shown in FIG. 3K. Each of the eight A control register stages has a conductor 20B connected to its clocked output. This conductor is connected to corresponding conductor 21B which is part of the output bus 18. Each conductor of the output bus 18 also is connected to a load circuit 22B.

FIG. 3C shows the logic structure of the B control register 24. Clock conductor E from the CS and R/W control circuit 11 shown in FIG. 3I is connected to the gate of clock driver MOSFET 4B whose source connects to ground. The drain of MOSFET 4B is connected to conductor 24B which connects to the register select logic shown in FIG. 3K. The B control register 24 consists of eight register stages BCφ–BC7. Register stage BC6 and register stage BC7 have special input connections, the remaining six register stages BCφ–BC5 are identical. Register stage BC6 and register stage BC7 have a common reset input conductor 1C which is coupled to the CS and R/W control logic circuits shown in FIG. 3I. Register stage BC7 has a "SET" input conductor SB7 and register stage BC6 has a "SET" input conductor SB6 which is connected to the edge sense circuits shown in FIG. 3H. The "SET" and "RESET" inputs of the remaining six register stages BCφ–BC5 are connected to the corresponding complimentary and non-complimentary conductors of the input bus 16. The input clock for register stages BCφ–BC6 is derived from the clock signal on conductor E which drives the gate of the clock driver MOSFET 13C. The drain of 13C is coupled to conductor 12C which in turn is coupled to the register select logic of FIG. 3K. Conductor 12C couples to the input clock connection of each of the six register stages BCφ–BC5. All eight of the register stages of the B control register 24 are coupled to the "light reset" conductor RD which is coupled to the register select logic 11 of FIG. 3K. Each of the eigh register stages has an output clock conductor which is coupled to conductor 11C which is coupled to register select logic of FIG. 3K. Each of the eight register stages has a corresponding clocked data output 13C which is coupled to the corresponding conductor of the output bus 18. Register bit BC2 has its non-complimented output coupled to conductor BC2 which is connected to the register select logic of FIG. 3K. The remaining seven register stages each have their non-complimentary output connected to conductors BCφ, BC1 and BC3–BC7 to form the conductor group AC which is coupled to the B interrupt/status control logic circuitry shown in FIG. 3H.

FIG. 3D shows data register 22 and the I/O data direction register 27. As explained in the functional operation section above, data register 22 stores output data from the MPU. This data appears on the corresponding peripheral data line if that line is programmed to act as an output. The function of the data direction register 27 is to allow each of the peripheral data lines to be programmed to act as an input or output. Writing "1" in a given I/O control register stage programs the corresponding peripheral data line to be an output. Similarly, writing a "0" programs the peripheral data line to be an input. The 16 conductors of the input bus 16 provide the data input for both registers. A non-complimented input bus conductor 11D connects to the "set" input of each of the data register stages AD-0–AD7 and each of the control register stages AIφλ 0–AIφ7. Similarly, a complimented input bus conductor 12B connects to the "reset" input of each of the data register stages and each of the control register stages. Each stage of the data register 22 also has an input clock connection 13D to a common input clock conductor 6B. Conductor 6B connects to the drain of clock driver MOSFET 2D whose gate is driven by the clock conductor E from the CS and R/W control logic circuitry shown in FIG. 3I.

Clock coonductor E also drives the base of a second clock driver MOSFET 4D whose drain connects to an input clock conductor 5D which connects to each of the input clock connections 16D of the control register stages. Thee two input clock conductors 6D and 5D also are coupled to the register select circuitry logic shown in FIG. 3K. Each data register stage has a input 15D, and each control register stage has an input 16D all of which couple together to connect to a "master reset" line RD which connects to the CS and R/W control logic circuitry shown in FIG. 3K.

Each of the data register stages AD0–AD7 has an output clock connection 22D which connects to an output clock conductor 7D which connects to the register select circuitry shown in FIG. 3K. Similarly, each of the control register stages AI/φφ–AI/φ7 has an ouput clock connection to an output clock conductor 8D, which connects to the register select circuitry shown in FIG. 3K.

Output operation is explained by considering one data register stage AD7 and the corresponding control register stage AIφ7. The operation of each of the remaining stages in each register is exactly the same.

Data register stage AD7 has a clocked data output 23D and control register stage AIφ7 has a clocked data output 18D which is connected to one conductor 10D of the output bus 18. Data register stage AD7 has a set input connection 25D to one of the eight conductors AD which are part of input bus 18. Data register stage AD7 has an output conductor 24D which couples to an additional "set" input of the corresponding control register stage AIφ7. The control register stage AIφ7 logically combines the data state transmitted by conductor 24D to produce an output signal which couples to conductor 19D. The logic state on conductor 19D is the same as that of conductor 24D, if register stage AIφ7 contains a logical "1". If register stage AIφ7 contains a logical "0", the logical state of conductor 19D stays fixed at "0". The conductors analogous to conductor 19D are connected to the output of each control register stage 21D and form the eight conductors of the output data bus 40, which is coupled to the B peripheral interface buffer circuitry shown in FIG. 3F.

FIG. 3E shows the B data register 23 and the data direction register 34. The function of these two registers is the same as that of the registers of FIG. 3D discussed above except that they serve the B peripheral data lines. The 16 conductors of the input bus 16 provide the data input for both registers. A non-complemented input bus conductor 11E is connected to the "set" input of a data register stage BD7 and a control register stage DIφ7. Similarly, a complemented input bus conductor 12E is connected to the "reset" input of a data register stage BD7 and a control register stage DIφ7. The input bus connections for the remaining stages of both registers follow the same pattern. Each stage of the B data register 23 also has an input clock connection 13E to a common input clock conductor 6E. This conductor connects to the drain of a clock driver MOSFET 2E whose gate is driven by the clock conductor E from CS and R/W control logic shown in FIG. 3I.

This clock conductor E also drives the gate of a second clock driver MOSFET 4E whose drain is connected to an input clock conductor 5E which is connected to each of the input clock connections 14E of the control register stages. The two input clock conductors 6E and 5E also are coupled to the register select control logic shown in FIG. 3K. Conductor 6E also is coupled to the B interrupt and status control logic circuitry shown in FIG. 3H. Each data register stage has an input 15E and each control register stage has an input 16E all of which are coupled together and connected to a "master reset" line RD which couples to the CS and R/W control logic shown in FIG. 3K.

Output operation is explained by considering one data register stage BD7 and the corresponding control register stage BIφ7. The operation of each of the remaining stages in each register is exactly the same.

Data register stage BD7 has an output clock connection 22E which is coupled to an output clock conductor 7E which is coupled to the register select circuitry shown in FIG. 3K. Similarly, the control register stage BIφ7 has an output clock connection 17E to an output clock conductor 8E which is connected to the register select circuitry shown in FIG. 3K. Data register stage BD7 has a clocked data output 23E and control register stage BIφ7 has a clocked data output 18E which is connected to one conductor 10E of the output bus 18. Data register stage BD7 has a "set" input connection 25D to one of the eight conductors AE which are part of input bus 18. Data register stage BD7 has an output conductor 24E which is part of the eight-conductor group BE which is part of the bus 39 coupled to the B peripheral interface buffer circuitry shown in FIG. 3F. The conductors analogous to conductor 19E which connects to the output of each control register stage 21E form the eight conductor group CE which is part of 39, which coupled to the B peripheral interface buffer circuitry shown in FIG. 3F.

FIG. 3F shows the B peripheral interface buffer 30 and the B peripheral data bus 31, which function to allow the bidirectional transfer of data between the "B" portion of the PIA and the associated peripheral unit.

B peripheral data bus 31 consists of the 8 pads PBφ-PB7. Pad PB7 connects to a circuit of the peripheral interface buffer 30 via conductor 15F' and to the associated peripheral unit via conductor 16F. Each of the remaining pads is connected in the same way forming the eight-conductor group FA to the peripheral unit.

The interface buffer 30 consists of eight identical logic circuits. Each circuit has an input conductor 1F from the eight conductor group CE which is coupled to data direction Register 34 shown in FIG. 3E. A logic signal on conductor 1F defines the direction of data flow for the interface buffer circuit 18F. A logical "1" on conductor 1F defines the direction of data flow from the buffer circuit 18F, to the peripheral conductor 16F. Conversely, a logical "0" on conductor 1F defines the direction of the data flow from conductor 16F to the interface buffer circuit 18F.

Consider the operation of the buffer circuit 18F when conductor 1F is a logical "1". This signal on conductor 1F is inverted by the inverter circuit 3F to make conductor 4F a logical "0". Conductor 4F is coupled to conductor 6F which is the "three-state" input to inverter 7F. For this case, the logic "0" signal on conductor 6F leaves inverter 7F uneffected. The logic "0" signal on conductor 4F also couples to conductor 5F to form a disabling input to AND gate 11F. Thus, AND gate 11F blocks the flow of data from the peripheral data bus via inverter 9F and coupling conductor 18F. With this condition, data from the B data register circuit of FIG. 3E is transmitted via conductor 13F, which is coupled to inverter 17F. The inverted data at the output of inverter 17F is provided at an input to inverter 7F via conductor 19F. The twice inverted data at the output of inverter 7F is coupled to pad PB7 of the B peripheral data bus 31 via conductors 8F and 15F. Thus, data flow is from the B data register of FIG. 3E through the peripheral data bus buffer circuit 18F to the B peripheral data bus 31.

The logic "1" signal on conductor 1F is coupled to an input of AND gate 10F, via conductor 2F, enabling the AND gate 10F. The inverted data present on conductor 19F is connected to the other input of AND gate 10F via conductor 20F. Since AND gate is enabled, the inverted data on conductor 20F is transmitted via AND gate 10F to NOR gate 12F which is connected back to the B data register shown in FIG. 3E via conductor 14F. This "feedback" of data to the B data register from which it originated provids an internal diagnostic capability for reading back the contents of the B data register to verify that they are the same as written.

Now consider the case where the signal on conductor 1F is a logical "0". Conductor 2F couples a logical "0" to the input of AND gate 10F, which is then disabled. This prevents the data state on conductor 13F from "feeding back" to the data register via inverter 17F, conductor 20F, AND gate 10F, and NOR gate 12F.

The logical "0" on conductor 1F is inverted by inverter 3F to produce a logical "1" on conductor 4F which is coupled to conductor 6F, the three-state input to inverter 7F. The logical "1" on conductor 6F forces the output of inverter 7F to the "high impedance" state. Thus the conductor 8F which is connected to the output of inverter 7F, is essentially coupled to an open circuit and logical conditions at the input to inverter 7F can have no effect on the data bus pad PB7 and the peripheral conductor 16F. A logic "1" is applied to conductor 4F which is connected to an input to AND gate 11F via conductor 5F, thus enabling AND gate 11F. Data from peripheral devices is transmitted via conductor 16F, pad 15F, conductor 15F', and conductor 8F', which is coupled to the input to inverter 9F. The resulting inverted data at the output to inverter 9F is transmitted via conductor 18F which is connected to the second input AND gate 11F, which is connected to the input to NOR gate 12F so that data twice inverted is produced on conductor 14F which is coupled to a data input of the B data register circuitry shown in FIG. 3E.

Thus a logical "0" on the data direction defining conductor 1F allows data to flow from the peripheral unit to the B data register and prevents extraneous data (on conductor 13F) from interferring with this data flow by disabling the AND gate 10F and the inverter 7F.

The operation of the remaining seven buffer circuits is exactly the same as described above. Thus the eight conductors 1F from the eight conductor group CE which is connected to the B I/O control register 34 shown in FIG. 3E. The logical state present on the eight conductors 1F can be envisioned as a control register "word" which defines the "data direction" for each conductor 16F of B peripheral data bus 31. The eight conductors 13F form the group BE which is connected to the B data register 23 shown in FIG. 3 are similarly connected. The logical state on the eight conductors 13F can be thought of as a "data word" being transmitted to the peripheral unit via the B peripheral data bus 31. The eight conductors 14F form the group AE which also is connected to the B data register 23 shown in FIG. 3E. The logical states on the eight conductors 14F can be thought of as a "data word" being transmitted from the B peripheral data bus 31 to the B data register 23.

It is important to note that the logical "0" or "1" present on conductor 1F of any given buffer circuit is independent of the other buffer circuits. Thus the B peripheral interface buffer 30 can be "programmed" to accommodate any combination of input bus conductors and output bus conductors simultaneously.

FIG. 3G shows the A peripheral interface buffer 28 and the eight peripheral interface bus conductors 29 which function to allow the bidirectional transfer of data between the "A" portion of the PIA and the associated peripheral unit. The A peripheral interface buffer 28 consists of eight identical buffer circuits 10G. Each buffer circuit contains circuitry for the transmission of data from the data and control register circuitry of FIG. 3D to a peripheral unit via the A peripheral data bus 29. Each buffer circuit 10G also contains circuitry for the transmission of data from the A peripheral data bus 29 to the data register circuitry of FIG. 3D. Consider first the case of data transmission from the register circuitry of FIG. 3D to the peripheral unit. Conductor 1G provides the data input signal for the buffer circuit 10G. As previously discussed for FIG. 3D, the logical signal on conductor 1G is conditioned by the contents of the data direction register 27 such tht data will be present only when the "data direction" is towards the A peripheral data bus 29. The logic signal on conductor 1G connects to the input inverter 2G to produce an inverted logic signal on conductor 3G which connects to conductor 4G, pad PA7, and conductor 6G. Conductor 6G is one of the eight conductors forming the eight conductor group GA. The conductors 1G for each of the eight buffer circuits 10G are grouped to form the internal bus 40 which connects to the data direction register 27 shown in FIG. 3D.

For the case of data transmission from the A peripheral data bus 29 to the A data register 22 of FIG. 3D, the logic signal on conductor 6G is transmitted via pad PA7, conductor 4G, and conductor 7G to the input of non-inverting driver AG. The resulting logic signal on the output of driver AG is coonnected to conductor 9G. The eight conductors 9G for the eight buffer circuits 10G form the eight conductor group AD which is connected to the A data register 22 of FIG. 3D.

FIG. 3H shows the B interrupt/status control logic 37, which consists of a "CB2" edge sense circuit 1H, a "CB2" output circuit 2H, a "CB1" edge sense circuit 3H, and a "IRQB" logic circuit 4H. The B interrupt/control status logic is connected to three external signal lines. As previously discussed in the PIA systems operation section above, conductor CB1 is an interrupt input line which transmits interrupt signals from the associated peripheral unit to the PIA. Conductor CB2 is a peripheral control signal line which may be programmed to act as an interrupt input from the associated peripheral or as a peripheral control output to the associated peripheral. Conductor IRQB is an interrupt request signal line which transmits a "interrupt request" from the PIA to the MPU.

The function of the two edge sense circuits 1H and 3H, is to sense either positive going transitions, negative going transitions or a DC level as the "active" signal state being transmitted by the associated peripheral unit. The definition of which signal state is "active" is determined by connections to the B control register who's contents can be altered under program control. The "CB2" edge sense circuit 1H has its input conductor CB2 from the associated peripheral unit, conductor BC4 and BC6 from the B control register circuitry of FIG. 3C and conductor E from the CS and R/W control logic circuitry of The "CB2" edge sense circuit 1H has an output conductor SB6' which is connected to the "set" input of register stage 6 of the B control register circuit shown in FIG. 3C. Similarly, the "CB1" edge sense circuit has input conductors CB1, BC1, BC7, and E and output (conductor SB7 which is connected to the "set" input of register stage 7 in the B control register circuit of FIG. 3C.

Further details on the structure and the functional operation of the edge circuits 1H and 3H are provided in the copending Motorola application Ser. No. 503,993, by William D. Mensch, Jr., filed on the same date as this application.

As previously discussed, the conductor CB2 functions as an input from the peripheral unit or an output to the peripheral unit depending on the programming of the B control register. The logic signal on conductor BC5 from the B control register circuit of FIG. 3C determines whether conductor CB2 is an input or an output. When conductor BC5 is a logical "0", conductor CB2 functions as an interrupt input and operates as previously described in the functional operation section above and in accordance with Table 4. Operation as an interrupt input implies that the "CB2" output circuit must be decoupled from conductor CB2. This decoupling is accomplished by the logical "0" on conductor BC5 which is connected to the three-state input of non-inverting driver 12H via conductor 38H. The logical "0" on conductor 38H forces the output of driver 12H to be in the high impedance state. Thus the conducting path from conductor CB2 to conductor 39H to the output of driver of 12H is essentially a connection to an open circuit and the "CB2" output circuit is effectively decoupled from conductor CB2 and can have no effect on its operation as an interrupt input.

When conductor BC5 is a logical "1", conductor CB2 is defined to be a control output signal line to the associated peripheral unit and the functional operation of the "CB2" output circuit 2H is as previously described in the functional operation section and in Table 5. The logical "1" on conductor BC5 is applied to the three-state input to non-inverting driver 12H via conductor 38H and the driver is "enabled" to allow functioning as a normal logic driver. The logical "1" on conductor BC5 also is connected to the input to inverter 8H via conductor 40H. The resulting logic "0" at the output of inverter 8H is connected to an input of NOR gate 10H via conductor 30H such that NOR gate 10H is enabled. This allows the flip-flop formed by NOR gate 10H, NOR gate 7H and the cross-connecting conductors 34H and 35H to be "set" and "reset" by the logical operations of the preceding gates and inverters of the output circuit. As previously shown in Table 5 and the associated discussion, the control of CB2 as an output requires that it be "set" i.e., be at a logical "1" level and be "clear" i.e., be at a logical "0" level in accordance with given sets of conditions of contents of the B control register, the "E" pulse and the "write" pulse. In discussing how the "CB2" output circuit logic accomplishes these required functions, first con-sider the "flip-flop" formed by NOR gate 10H, NOR gate 7H, and cross-connecting conductors 34H and 35H. NOR gate 10H has three inputs connected to conductors 10H', 30H and 34H. A logical "1" on any of these three inputs will force the output of NOR gate 10H to a logical "0". This logical "0" is coupled to one input to NOR gate 7H by conductor 35H. If the other input conductor 7H' of NOR gate 7H is also at a logical "0", the output of NOR gate 7H will be at a logical "1". The resulting logical "1" on conductor 34H is connected back to one input of NOR gate 10H, holding the output of NOR gate 10H at a logical "0" level. Thus the "flip-flop" formed by NOR gate 10H and NOR gate 7H has been locked into a steady state, which we refer to as the "set" state. With the flip-flop set, the logical "0" on conductor 34H is connected to the input of inverter 11H. The resulting logical "1" at the output of inverter 11H is connected to the input of noninverting driver 12H via conductor 37H. The resulting logical "1" at the output of driver 12H is connected to conductor 39H, which is connected to conductor CB2, which is the peripheral control line to the associated peripheral unit. Thus, it is shown that when the flip-flop formed by NOR gates 7H and 10H is "set", the "set" condition required for output conductor CB2 by Table 5 is established. Conversely, the flip-flop formed by NOR gates 7H and 10H can be "reset" if a logical "1" at input 7H' of NOR gate 7H forces the output of NOR gate 7H to a logical "0", which is then maintained at a steady state by the cross-coupling action of conductor 34H, NOR gate 10H and conductor 35H. This "reset" state produces a logical "1" on conductor 36H which is coupled to the input of inverter 11H. The resulting logical "0" at the output of inverter 11H is coupled to the input of noninverting driver 12H via conductor 37H. This results in a logical "0" on conductor 39H and conductor CB2.

Next consider the logical conditions under which the flip-flop formed by NOR gate 7H and NOR gate 10H is either set or reset. NOR gates 5H, 6H and 7H form an AND-NOR structure and NOR gates 10H, 13H, 15H and 17H also form such a structure. With such a structure and the cross-coupled connection of NOR gate 7H and NOR gate 10H via conductors 34H and 35H, a "flip-flop" structure is formed which can only be "set" or "reset" by unique combinations of logic levels at the AND gate inputs. Thus, for example, a logical "1" on conductor 26H connected to one input of AND gate 5H and a logical "1" on conductor 28H connected to the other input to AND gate 5H will result in a logical "0" at the output of AND gate 5H which is connected to input 7H' of NOR gate 7H. This logical "0" "resets" the flip-flop formed by NOR gate 7H, NOR gate 10H and the cross-coupling conductors 34H and 35H as previously discussed. Now consider the four sets of conditions which will "set" flip-flop formed by NOR gate 7H and NOR gate 10H. First, "set" will occur if conductor 30H is a logical "1". As previously discussed, the definition of conductor CB2 as an output requires that a logical "0" on conductor 30H so that conductor 30H has no effect on the operation of CB2 as an output. Second, consider AND gate 13H which has one input connected to conductor BC3 via conductor 44H and 46H; and a second input connected to conductor BC4 via conductor 48H and 47H. Thus, AND gate 13H will set the flip-flop if both conductor BC3 and conductor BC4, which connect to the B control register circuitry of FIG. 3C, are at a logical "1". Third, consider AND gate 15H. The inputs to this gate are derived from conductors BC3, BC4 and BC7 which connect to the B control register circuitry of FIG. 3C. Conductor BC3 connects to the input to inverter 9H via conductors 43H and 41H. The output of inverter 9H connects to an input of AND gate 15H via conductors 42H and 52H. Conductor BC4 is connected to the input of inverter 14H via conductors 49H' and 49H. The output of inverter 14H is connected to another input to AND gate 15H via conductors 50H and 51H. Conductor BC7 connects to conductor 15H' which is connected to the third input to AND gate 15H. Thus, because of the logical inversion of the inverters 9H and 14H, AND gate 15H will "set" the flip-flop when conductor BC3 is a logical "0", conductor BC4 is a logical "0" and conductor BC7 is a logical "1". Finally, consider the required logical input conditions for AND gate 17H. One input will be a logical "1" when conductor BC4 is a logical "0" because of its connection to the output of inverter 14H via conductors 50H and 53H. A second input will be a logical "1" when conductor BC3 is a logical "1" because of its connection via conductors 43H, 44H and 45H. To determine the logical conditions on the third input to AND gate 17H, consider the "flip-flop" formed by NOR gate 19H, NOR gate 20H and cross-coupling conductors 56H and 57H. This flip-flop is "set" by a logical "1" on the WRITE conductor which is connected to the CS and R/W control circuitry of FIG. 3I. A logical "1" on the write conductor sets the flip-flop forcing the output of NOR gate 19H to a logical "0". This logical "0" is coupled to one input of NAND gate 18H via conductor 58H. The other input of NAND gate 18H is the logical complement of the signal on conductor E which is connected to the CS and R/W control logic circuitry shown in FIG. 3I. Conductor E is connected to the input of inverter 16H via conductor 27H. The output of inverter 16H is connected to the other of the NAND gate 18H via conductor 55H. The logical action of NAND gate 18H and its connection to the input of AND gate 17H via conductor 54H results in a logic "1" at the input to AND gate 17H when conductor E and the write conductor are at a logical "1" level.

Now consider the logical conditions which will "reset" the control flip-flop formed by NOR 7H and 10H. A logical "1" on conductor E is coupled to one input of AND gate 5H via conductors 26H' and 26H. Conductor 6E which is connected to the B data register circuitry of FIG. 3E, will be at a logical "1" whenever data is clocked into the B data register as discussed above. This logical "1" is coupled to the "reset" input of the flip-flop formed by NOR gates 20H and which then couples a logical "1" to the other input of AND gate 5H via conductors 58H and 28H. Thus AND gate 5H will "reset" the control flip-flop formed by NOR gates 7H and 10H when conductor E is a logical "1" and conductor 6E is a logical "0". Next consider the logical action of AND gate 6H. A logical "0" on conductor BC3 connected to the inverter 9H via conductors 43H and 41H results in a logical "1" on conductor 42H which is connected to one input of AND gate 6H via conductor 29H. A logical "1" on conductor BC4 results in a logical "1" at the other input of AND gate 6H via conductors 49H' and 32H. Thus AND gate 6H will reset the control flip-flop formed by NOR gate 7H and 10H, when conductor BC3 is at a logical "0" and conductor BC4 is at a logical "1". Thus the logical conditions required for correct operation of conductor CB2 as a control output to the associated peripheral unit are fulfilled by the logical functions of the "CB2" output circuit logic, in accordance with Table 5 and the associated discussion in the functional operation section above.

The remaining functional element of the E interrupt/status control logic 47 is the "IRQB" logic circuit 4H. As previously discussed in the functional operation above, the interrupt request line IRQB acts to interrupt the MPU either directly or through interrupt priority circuity. The IRQB line goes low when bit 7 in the B control register is at a logical "1" and bit "0" of the B control register is at a logical "1", or when bit 6 in the B control register is at a logical "1" and bit 3 in the B control register is a logical "1". The system conditions leading to these logical states for the B control register stages are summarized in Tables 2, 3 and 4 and the associated discussion above. These required functional conditions are accomplished by the IRQB logic circuit 4H as follows.

Conductors BCφ, BC3, BC6, and BC7 are connected, respectively, to register stages 0, 3, 6, and 7 of the B control register shown in FIG. 3C such that when a register stage is in the logical "1" state, the corresponding "BC" conductor will be at a logical "1". Thus a logical "1" on conductor BC6 applies a logical "1" to one input of AND gate 21H via conductor 64H and a logical "1" on conductor BC3 applies a logical "1" to the other input of AND gate 21H via conductor 65H. The action of the AND-NOR gate formed by 21H and 22H results in a logical "0" at the output of NOR gate 22H. This logical "0" is connected to the input to inverter 23H via conductor 59H producing a logical "1" on conductor 68H, which is connected to the gate of MOSFET 61H. The logical "1" on the gate of MOSFET 61H drives it into saturation such that there is a low impedance path from the drain of MOSFET 61H to the source of MOSFET 61H which is connected to conductor 62H which connects to ground. This results in ground voltage on conductor 63H which is connected to the IRQB conductor which is the B interrupt request signal line to the MPU system. Similarly, a logical "1" on conductor BC7 is applied to one input of AND gate 25H via conductor 66H and a logical "1" on conductor BCφ is applied to the other input of AND gate 25H, connecting the IRQB conductor to ground via the same logical sequence as was just described for AND gate 21H etc.

FIG. 3I shows one part of the CS and R/W control logic 11. This circuit has five input connections from the MPU. Pad E, which provides the timing for the PIA chip, is connected to conductor 1I. Pad CS1 connected to conductor 20I, pad CS2 connected to conductor 5I, and pad $\overline{CS3}$, connected to conductor 9I, provide links to the MPU address bus for selection of a particular PIA chip. Pad R/W connected to conductor 21I provides a signal path to the MPU which determines whether the MPU system is reading from the PIA chip or writing into the PIA chip. The CS2 signal on conductor 5I is coupled to one input on NAND gate 25I via inverter 6I, conductor 7I, and conductor 15I. The $\overline{CS3}$ signal on conductor 9I is coupled to another input of NAND gate 25I via inverter 10I, inverter 11I, conductor 12I, and conductor 14I. The CS1 signal on conductor 20I is coupled to the third input to NAND gate 25I via inverter 19I, conductor 18I and conductor 16I. When a given PIA chip is to be selected, the logic signals on the MPU address bus will result in a logical "1" on pad CS1, a logical "1" on pad CS2 and a logical "0" on pad $\overline{CS3}$. These signals result in logical "0's" on all three inputs to NAND gate 25I to produce a logical "1" at the output of NAND gate 25I. The line 26I shown in FIG. 3I denotes that NAND gate 25I makes use of special "bootstrap" circuitry in its implementation for improved signal level and signal timing performance. This notation on other gates in FIG. 3I should be interpreted in the same way. The logic "1" at the output of NAND gate 25I is connected to one input to NAND gate 35I' via conductor 35I. The clock signal on conductor 1I is inverted and connected to the other input to NAND gate 35I' via conductors 35I, and 33I, and inverter 36I. The "active" time for the clock signal on conductor 1I is when the signal is at a logical "0". This logical "0" results in a logical "1" at the output of inverter 36I which is connected to the input to NAND gate 35I'. The output of NAND gate 35I' is thus a "clocked selection signal" which will be at a logical "1" when the PIA chip is selected at the active time of the clock signal. The output of NAND gate 35I' is connected to the set input of a first "register timing" flip-flop formed by NOR gate 55I, NOR gate 58I and cross coupling conductors 57I and 58I, via conductor 53I and to the set input of a second "register timing" flip-flop formed by NOR gate 59I, NOR gate 60I and cross coupling conductors 61I and 62I via conductor 54I. When these two flip-flops are "set" by a logical "1" on conductor 49I, a logical "1" is transmitted to the A control register shown in FIG. 3B via conductor 13B and a logical "1" is transmitted to the B control register shown in FIG. 3C via conductor 1C. The chip select signals on conductors 7I, 12I and 18I are coupled to three inputs of NOR gate 27I via conductors 8I, 13I and 17I, respectively. The logical complement of the "read/write" signal from the MPU is connected to the fourth input of NAND gate 27I via the R/W pad, conductor 21I, inverter 22I and conductor 23I. The output of NAND gate 27I is connected to one input of NAND gate 3I via conductor 4I. The other input of NAND gate 3I is connected to the clock signal on conductor 1I via conductor 2I. The output of NAND gate 3I is connected to conductor TSC, which is the three-state control line connecting the data bus buffer circuitry of FIG. 3A. As previously discussed under FIG. 3A, the three-state control line must be at a logical "1" during operations when the MPU wishes to write information into the PIA. First consider an MPU which is indicated by a logical "0" on the R/W pad which will result in a logical "0" being applied to one input of NAND gate 27I. The other three inputs of NAND gate 27I will all be at logical "0" when the PIA chip is selected. This results in a logical "1" at the output of NAND gate 27I, which is connected to the input of NAND gate 3I via conductor 4I. The active time of the clock signal applies a logical "1" to the other input to NAND gate 3I via conductor 2I resulting in a logical "0" on conductor TSC which is the three-state control line to the data bus buffer circuitry of FIG. 3A. This logical "0" allows the transmitting inverters of the data bus buffer circuitry to function as normal inverters as required for an MPU read operation. For the case of an MPU write operation the logical "0" on the R/W pad results in a logical "0" on conductor 4I, such that conductor TSC is forced to a logical "1". This logical "1" forces the transmitting inverters of the data bus buffer circuitry of FIG. 3A to the "high impedance" state such that they cannot interfere with an MPU write operation. The logical "0" at the output of NAND gate 3I during a read operation is coupled to inverter 30I via conductor 29I to produce a logical "1" on conductor 43I. This logical "1" is applied to one input of AND gates 56I' and 60I' via conductors 43I' and 52I. A register select signal from FIG. 3D is applied to the other input of AND gate 56I' via conductor 1D and a register select signal from FIG. 3E is applied to the other input to AND gate 60I' via conductor 1E. A logical "1" on these register select lines combined with a logical "1" on conductor 43I' or on conductor 52I due to an MPU read operation as discussed above, results in resetting the flip-flop formed by NOR gates 55I, 56I, and cross coupling conductors 57I and 58I or of the flip-flop formed by NOR gates 59I and 60I and cross coupling conductors 61I and 62I. This resetting will force conductor 13B which is connected to the A control register circuitry of FIG. 3B or conductor 1C which is connected to the B control register circuitry of FIG. 3C to a logical "1" to meet the control register requirements discussed in the functional operation section above. The remaining logic circuitry of FIG. 3I concerns the generation of a "write" signal to the peripheral output circuitry of FIG. 3H. This circuitry consists of AND gate 37I, the flip-flop formed by NOR gates 38I' and 38I and the cross coupling conductors 38I and 40I, and the NAND gate 51I. This flip-flop, which is normally set, will be reset to produce a signal on the WRITE conductor whenever the MPU wishes to write into the PIA. The clocked selection signal at the output of NAND gate 35I is coupled to the one set input of the flip-flop via conductor 41E. Conductor 41E will be a logical "1" during the active clock time of each cycle when the PIA is selected and this logical "1" will reset the flip-fop formed by NOR gates 38I' and 38. The resulting logical "0" is coupled to one input to NAND gate 51I via conductor 50I. The conductor 44I applies a logical "0" to the other input of NAND gate 51I during the inactive portion of the clock cycle. The output of NAND gate 51I will thus produce a signal which is a logical "1" during the inactive clock time and a logical "0" during the active clock time, this signal connecting to the CB2 output circuitry of FIG. 3H via the WRITE conductor. During an MPU write operation the R/W pad connected to conductor 21 is a logical "0". The inversion of 22I results in a logical "1", which is coupled to one input of AND gate 37I via conductors 23I and 32I. Conductor 34I applies a logical "1" to another input of AND gate 37I during the time that the PIA chip is selected. Conductor 31I is connected to the third input to AND gate 37I and applies a clock signal which is a logical "1" during the active clock time. The three inputs of AND gate 37I all logical "1's", reset the flip-flop producing a logical "0" at the output of NOR gate 38I, which is connected to the input of NOR gate 38I' via conductor 39I. Since the other inputs of NOR gate 39I are both logical "0", the output of NOR gate 38I' will apply a logical "1" to one input of NAND gate 51I via conductor 50I. This logical "1" will force the output of NAND gate 51I which connects to the CB2 output circuit of FIG. 3H via the WRITE conductor to a logical "0" which will be maintained as long as the flip-flop stays in the write or reset condition. The flip-flop will be set to resume normal read operations when the chip select interval is completed and the output of NAND gate 35I' couples a logical "1" to the input of NOR gate 38I' via conductor 41E. The flip-flop is also reset by a "master reset" signal to the PIA which causes the RD connector from the CS and R/W control logic circuitry of FIG. 3K to be a logical "1" which is then connected to another input of NOR gate 38I'.

The flip-flop formed by NOR gates 38I and 38I' and the cross-coupling conductors 39I and 40I is also used to generate an enable signal for the register select circuitry of FIG. 3K. The output of NOR gate 38I' is connected to the input of the bootstrapped inverter 45I via conductor 42I. The output of inverter 45I is connected to conductor FCS which is connected to the register select circuitry of FIG. 3K. The logical "1" at the output of NOR gate 38I' during a MPU write operation causes conductor FCS to be at logical "0" which enables the register select circuitry of FIG. 3K.

FIG. 3J shows the A interrupt/status control logic 25. The logic structure of this circuit is very similar to that of the B interrupt/status control logic 37 shown in FIG. 3H and the detailed description of that logic figure applies. To aid in the aplication of the detailed logic description of FIG. 3H to the structure of FIG. 3J, the logic element designations have been chosen so that the numerical portion is the same and the letter suffix has been changed from "H" to "J". Thus the A interrupt/status control logic 25 consists of a "CA2" edge sense circuit 1J, a "CA2" output circuit 2J, a "CA1" edge sense circuit 3J and a "IRQA" logic circuit 4J. The general functional operation of these four circuits is the same as discussed under FIG. 3H except that they relate to a peripheral unit associated with the "A" control, data, input-output, and peripheral circuitry.

The two edge sense circuits 1J and 3J and the "IRQA" logic circuit 4J have exactly the same structure and function as the corresponding circuits shown in FIG. 3H, and the discussion of FIG. 3H suffices to completely define their operation. The "CA2" output circuit 2J has the same general function as the corresponding "CB2" output circuit 2H, but there are minor functional and structural differences as is explained below.

It is noted in the PIA systems operation section above, the peripheral control line CA2 differs from the peripheral control line CB2 in that as an input, it represents one standard TTL load. Thus the three-state non-inverting driver 12H and the three-state control conductor 38H required in the B circuit are not used in the A circuit and are omitted in FIG. 3J so that inverter 11J connects to conductor 37J which connects directly to the pad CA2 and the CA2 input conductor to edge sense circuit 1J. The disabling of the CA2 output circuit 2J, indicating that conductor CA2 is to provide an input path from the associated peripheral unit, is accomplished by a logical "1" on conductor $\overline{AC5}$ from the A control register circuit of FIG. 3B. Conductor $\overline{AC5}$ is connected to one input of the NOR gate 10J, forcing the control flip-flop formed by NOR gate 7J, NOR gate 10J and cross coupling conductors 34J and 35J to the reset state. The resulting logical "0" on conductor 36J forces the output of inverter 11J to a logical "1" which connects to the CA2 pad via conductor 37J. Except for its presence of an additional TTL load, conductor 37J will not impede the operation of conductor CA2 as an input from the associated peripheral unit to the edge sense circuit 1J. The operation of the control flip-flop formed by NOR gates 7J and 10J and the various signal combinations applied to the inputs of AND gates 5J and 6J to reset the control flip-flop and to the inputs to AND gates 13J, 15J and 17J together with the input to NAND gate 18J to set the control flip-flop are the same as recited for the corresponding logic structures in FIG. 3H. As indicated in Table 6 and the associated discussion in the functional operator section above, however, the operating conditions and sequences for conductor CA1 as an output differ slightly from the requirements for conductors CB2 as an output. To accomplish the differences in Table 6 from Table 5, the circuitry of FIG. 3J differs from that of FIG. 3H in the following ways.

One input to AND gate 5J is connected to the clock conductor E from the CS and R/W control logic shown in FIG. 3K via conductor 26J', inverter 28J' and conductor 26J. The other input of AND gate 5J is connected to the reset timing signal on conductor 13B from the input register and A control register circuitry of FIG. 3B via conductor 28J so that the control flip-flop formed by NOR gate 7J NOR gate 10J and cross coupling conductors 34J and 35J is reset when conductor E is a logical "0" and conductor 13B is a logical "1". Conductor 13B also is connected to one input of NAND gate 18J via conductor 58J. The other input of NAND gate 18J is connected to conductor E via conductor 44J and its output is connected to one input of AND gate 17J via conductor 54J. Another input of AND gate 17J is connected to conductor AC3 from the A control register circuitry of FIG. 3B via conductors 43J, 44J, and 45J. The third input to AND gate 17J is connected to conductor AC4 from the A control register of FIG. 3B via conductors 49J', 49J, inverter 14J and conductors 50J and 53J. This results in the control flip-flop being set when conductor 13B and conductor 55J are both logical "0" producing a logical "1" at one input to AND gate 17J via conductor 54J and when conductor AC3 is a logical "1" and conductor AC4 is a logical "0" resulting in logical "1" at the other two inputs of AND gate 17J. All other logic elements of the CA2 output circuit 2J correspond to those elements shown in the CB2 output circuit 2H of FIG. 3H so that the logic description of that figure applies and the functioning of the CA2 output circuit 2J has been shown to meet the requirements of Table 6 and the associated discussion in the functional operation section above.

FIG. 3K shows the register select portion of the CS and R/W control logic circuit 11. As previously discussed in the functional operation section and in Table 2 above, two register select lines connected to the MPU address bus plus bit 2 of the A or B control register are used as the basic information for selecting the various registers within the PIA circuit. The circuitry of this figure gives the detailed logic structure by which this register selection is accomplished. This figure also shows circuitry associated with the "master reset" signal which can be used to reset all register bits in the PIA to a logical "0".

The selection operations of this circuit are performed by a series of NAND gates which decode the binary coded selection information provided by the MPU address bus and the contents of the A and B control registers. Pad RS$\phi$ which is connected to the MPU address bus is connected to the input of inverter 3K via conductor 3K'. The output of inverter 3K is connected to conductor $\overline{RS0}$, which multiples to the appropriate NAND gate and which will be a logical "0" when pad RS$\phi$ is a logical "1". Similarly, pad RS1 which connects to the MPU address bus, is coupled to the input of inverter 2K via conductor 2K'. The output of inverter 2K is connected to conductor $\overline{RS1}$, which multiples to the appropriate NAND gate and will be a logical "0" when pad RS1 is a logical "1". Conductor RS$\phi$ also is connected to the input of delay flip-flop 5K whose set and reset output are connected to conductors R$\phi$ and $\overline{R\phi}$, respectively, to provide additional coded select information to the appropriate NAND gates. Conductor $\overline{R0}$ also is connected to the input of inverter 11K whose output is connected to conductor RS$\phi$ which is multipled to the appropriate NAND gates providing the logical complement of the logic signal on conductor $\overline{RS\phi}$. Similarly, conductor $\overline{RS1}$ is connected to an input of delay flip-flop 6K, whose set and reset outputs connect to conductors R1 and $\overline{R1}$, respectively, providing additional coded selection information to the appropriate NAND gates. The logical input conditions applied to flip-flops 5K and 6K by conductors $\overline{RS0}$ and $\overline{RS1}$ are clocked into the flip-flops by the clock signal on conductor E which is connected to the CS and R/W control logic circuitry shown in FIG. 3I and to the clock input of each flip-flop. The remaining coded register selection information required by the circuit is provided by conductor AC2 which is connected to the A control register circuitry of FIG. 3B and by conductor BC2 which is connected to the B control register circuitry of FIG. 3C. In addition to being connected directly to the appropriate NAND gates, these two conductors are connected to inverters 12K and 17K whose outputs produce the logical complement on conductors $\overline{AC2}$ and $\overline{BC2}$ which are then connected to the appropriate NAND gate inputs. The basic timing for the register select signals generated by this circuit is provided by the clock signal on conductor E which is connected to the CS and R/W control logic circuitry of FIG. 3I and which multiples to the appropriate NAND gate inputs. The "enable" signal on conductor $\overline{FCS}$ discussed in FIG. 3I also is connected to the appropriate NAND gate inputs.

Continuing in accordance with the requirements set out in Table 2 and the associated discussion in the functional operation section above, the output of NAND gate 7K provides an input selection signal for the A control register circuit of FIG. 3B via conductor 24B which is connected to the input clock of each register stage. Conductor 24B will be a logical "1" when inputs R1, Rφ, $\overline{FSC}$, and E are all at logical "0". It should be noted that all NAND gates of FIG. 3B contain "bootstrap" circuitry to provide better dynamic performance. The line 7K' associated with NAND gate 7K shows the notation used to indicate a bootstrap output. The output of NAND gate 8K provides an additional selection signal for the A control register circuit of FIG. 3B via conductor 19B, which is connected to the output clock terminal of each register stage. Connector 19B will be at a logical "1" when the two inputs of NAND gate 8K, which is connected to conductors RS1 and $\overline{RS\phi}$, are both at a logical "0". The output of NAND gate 9K provides a selection signal for the B control register of FIG. 3C via conductor 12C which is connected to the input clock of each register stage. Conductor 12C is at a logical "1" when the inputs of NAND gate 9K, which are connected to conductors $\overline{R1}$, Rφ, $\overline{FCS}$, and E, are all at a logical "0". NAND gate 10K provides additional selection for B control register of FIG. 3C via conductor 11C, which connects to the output clock terminal of each register stage. Conductor 11C will be at a logical "1" when the inputs of NAND gate 10K which are connected to conductors $\overline{RS1}$ and $\overline{RS\phi}$, are both logical "0". The output of NAND gate 13K provides selection for the A data register of FIG. 3D via conductor 6D, which is connected to the input clock of each register stage. Conductor 6D will be at a logical "1" when the inputs of NAND gate 13K, which are connected to conductors $\overline{AC2}$, R1, Rφ, $\overline{FCS}$ and E, are all logical "0". The output of NAND gate 14K provides additional selection for the data direction register of FIG. 3D via conductor 5D which is connected to the input clock terminal of each register stage. Conductor 5D will be a logical "1" when the inputs of NAND gates 15K, which are connected to conductors AC2, R1, Rφ, $\overline{FCS}$, and E are all logical "0's". The output of NAND gate 16K provides additional selection for the data direction register of FIG. 3D via conductor 8D which is connected to the output clock terminal of each register stage. Conductor 8D will be at a logical "1" when the inputs of NAND gate 16K which are connected to conductors AC2, RS1 and RS0 are all logical "0". The output of NAND gate 18K provides selection for the B data register of FIG. 3E via conductor 6E which is connected to the input clock terminal of each register stage. Conductor 6E will be at a logical "1" when the inputs of NAND gate 18K, which are connected to conductors $\overline{DC2}$, $\overline{R1}$, Rφ, $\overline{CS1}$ and E are all logical "0". The output of NAND gate 19K provides additional selection for the B data register of FIG. 3E via conductor 7E, which is connected to the output clock terminal of each register stage. Conductor 7E will be at a logical "1" when the inputs of NAND gates 16K, which are connected to conductors $\overline{BC2}$, $\overline{RS1}$, and RSφ are all logical "0". The output of NAND gate 20K provides selection for the B input-output control register of FIG. 3E via conductor 5E, which connects to the input clock terminal of each register stage. Conductor 5E will be at a logical "1" when the inputs of NAND gate 20K, which are connected to conductors BC2, $\overline{R1}$, R0, $\overline{FCS}$ and E, are all logical "0". The ouput of NAND gate 21K provides additional selection for the B input-output control register of FIG. 3E via conductor 8E, which is connected to the output clock terminal of each register stage. Conductor 8E will be at a logical "1" when the inputs to NAND gate 21K which are connected to conductors BC2, $\overline{RS1}$, and RSφ, are all logical "0".

FIG. 3K also contains circuitry for the "master reset" feature of the PIA chip used to reset all register bits in the PIA to a logical "0". The "master reset" signal from the MPU is connected to pad RS which is connected to the input of inverter 1K via conductor 1K'. The output of inverter 1K is connected to conductor RD, which connects to the register circuitry of FIGS. 3B, 3C, 3D, and 3E and to the CS and R/W control logic of FIG. 3I. When the reset pad goes to a logical "0", the "active level", conductor RD goes to a logical "1" to provide the register reset function described in the PIA systems operation section above.

While the invention has been described mainly with reference to a particular presently preferred embodiment thereof, those skilled in the art will recognize that variations in arrangement and placement of parts may be made within to suit varying requirements with the scope of this invention.

TABLE 1

| | | INTERNAL ADDRESSING | | |
| | | Control Register Bit | | |
| RS1 | RS0 | AC-2 | BC-2 | Location Selected |
|---|---|---|---|---|
| 0 | 0 | 1 | X | Peripheral Interface A |
| 0 | 0 | 0 | X | I/O Control Register A |
| 0 | 1 | X | X | Control Register A |
| 1 | 0 | X | 1 | Peripheral Interface B |
| 1 | 0 | X | 0 | I/O Control Register B |
| 1 | 1 | X | X | Control Register B |

TABLE 2

| | CONTROL WORD FORMAT | | | | | |
|---|---|---|---|---|---|---|
| | 7 | 6 | 5 4 3 | 2 | 1 | 0 |
| AC | IRQA1 | IRQA2 Control | CA2 Access | DDRA | CA1 | Control |
| | 7 | 6 | 5 4 3 | 2 | 1 | 0 |
| BC | IRQB1 | IRQB2 Control | CB2 Access | DDRB | CB1 | Control |

TABLE 3

| CONTROL OF INTERRUPT INPUTS CA1 AND CB1 | | | | |
|---|---|---|---|---|
| AC-1 (BC-1) | AC-0 (BC-0) | Interrupt Input CA1 (CB1) | Interrupt Flag AC-7 (BC-7) | MPU Interrupt Request IRQA (IRQB) |
| 0 | 0 | ↓ Active | Set high on CA1 (CB1) | Masked-IRQ remains high |
| 0 | 1 | ↓ Active | Set high on CA1 (CB1) | Goes low when the interrupt flag bit AC-7 (BC-7) goes high |
| 1 | 0 | ↑ Active | Set high on CA1 (CB1) | Masked-IRQ remains high |
| 1 | 1 | ↑ Active | Set high on CA1 (CB1) | Goes low when the interrupt flag bit AC-7 (BC-7) goes |

TABLE 4
CONTROL OF CA2 AND CB2 AS INTERRUPT INPUTS
AC-5 (BC-5) is low

| AC-5 (BC-5) | AC-4 (BC-4) | AC-3 (BC-3) | Interrupt Input CA2 (CB2) | Interrupt Flag AC-6 (CRB-6) | MPU Interrupt Request IRQA (IRQB) |
|---|---|---|---|---|---|
| 0 | 0 | 0 | ↓ Active | Set high on ↓ of CA2 (CB2) | Masked-IRQ remains high |
| 0 | 0 | 1 | ↓ Active | Set high on ↓ of CA2 (CB2) | Goes low when the interrupt flag bit AC-6 (BC-6) goes high |
| 0 | 1 | 0 | ↑ Active | Set high on ↑ of CA2 (CB2) | Masked-IRQ remains high |
| 0 | 1 | 1 | ↑ Active | Set high on ↑ of CA2 (CB2) | Goes low when the interrupt flag bit AC-6 (BC-6) goes high |

Notes:
1. ↑ Indicates positive transition (low to high)
2. ↓ Indicates negative transition (high to low)
3. The interrupt flag bit AC-6 is cleared by an MPU Read of the A Data Register and BC-6 is cleared by an MPU Read of the B Data Register
4. If AC-3 (BC-3) is low when an interrupt occurs (interrup mask) and is later brought high, IRQA (IROB) occurs on the positive transition of AC-3 (BC-3).

TABLE 3-continued
CONTROL OF INTERRUPT INPUTS CA1 AND CB1

| AC-1 (BC-1) | AC-0 (BC-0) | Interrupt Input CA1 (CB1) | Interrupt Flag AC-7 (BC-7) | MPU Interrupt Request IRQA (IRQB) |
|---|---|---|---|---|
| | | | | high |

Notes:
1. Indicates positive transition (low to high)
2. Indicates negative transition (high to low)
3. The interrupt flag bit AC-7 is cleared by an MPU Read of the A Data Register and BC-7 is cleared by an MPU Read of the B Data Register
4. If AC-0 (BC-0) is low when an interrupt occurs (Interrupt masked) and is later brought high, IRQA (IRQB) occurs on the positive transition of (CAC-0 (CBC-0).

TABLE 5
CONTROL OF CB2 AS AS OUTPUT
BC-5 is high

| BC-5 | BV-4 | BC-3 | CB2 Cleared | CB2 Set |
|---|---|---|---|---|
| 1 | 0 | 0 | Low on the positive transition of the first E pulse following an MPU Write "B" Data Register operation | High when the interrupt BC-7 is set by an active transition of the CB1 signal |
| 1 | 0 | 1 | Low on the positive transition of the first E pulse following an MPU Write "B" Data Register operation. | High on the positive transition of the next "E" pulse |
| 1 | 1 | 0 | Low when BC-3 goes low as a result of an MPU Write in Control Register "B". | Always low as long as BC-3 is low. Will go high on an MPU Write in Control Register "B" that changes to "one" |
| 1 | 1 | 1 | Always high as long as BC-3 is high. Will be cleared when an MPU Write Control Register "B" results in clearing BC-3 to "zero" | High when BC-3 goes high as a result of an MPU Write into control register "B" |

TABLE 6

CONTROL OF CA2 AS AN OUTPUT
AC-5 is high

| AC-5 | AC-4 | AC-3 | CA2 Cleared | CA2 Set |
|---|---|---|---|---|
| 1 | 0 | 0 | Low on negative transition of E after an MPU Read "A" Data operation. | High on an active transition of the CA1 signal. |
| 1 | 0 | 1 | Low immediately after an MPU Read "A" Data operation. | High on the negative edge of the next "E" pulse. |
| 1 | 1 | 0 | Low when AC-3 goes low as a result of an MPU Write in Control Register "A". | Always low as long as AC-3 is low. |
| 1 | 1 | 1 | Always high as long as AC-3 is high. | High when AC-3 goes high as a result of a Write in Control Register "A". |

What is claimed is:

1. An interface adaptor comprising:
    a select input, a read-write input, a plurality of data bus terminals, and a plurality of peripheral data bus terminals;
    a control bus, a first bus, and a second bus, each of said buses including, respectively, a plurality of conductors;
    control means coupled to said control bus for producing control signals on said conductors of said control bus;
    select means responsive to said control means, and having first and second outputs, for producing first and second select signals, respectively, on said first and second outputs in response to said select input;
    first buffer means responsive to said control means and to said read-write input and coupled to said data bus terminals, said first bus, and said second bus for transferring information from said data bus terminals to said first bus and for transferring information from said second bus to said data bus terminals;
    first storage means responsive to said control means and coupled to said first output of said selection means and to a first conductor of said first bus for storing a bit of select information from said first conductor in response to said first select signal;
    second storage means response to said control means and to said first storage means and coupled to said second output of said select means for storing a byte of direction control information received from said first bus in response to a coincidence of said second select signal and the condition that said bit of select information is a first logical state;
    second buffer means responsive to said control means and to said second storage means and coupled to said peripheral data bus terminals, said first bus, and said second bus for transferring information from conductors of said first bus to corresponding peripheral data bus terminals and for transferring information from said peripheral data bus terminals to corresponding conductors of said second bus, the direction of each of said transfers of information in said second buffer means being determined by the corresponding bits of said byte of direction control information in said second storage means, said transfers of information in said second buffer means occurring in response to a concurrence of said second select signal and the condition that said bit of select information in a second logical state.

2. The interface adaptor as recited in claim 1 further including an input register responsive to said control means and coupling said first buffer means to said first bus.

3. The interface adaptor as recited in claim 1 further including a data register responsive to said control means and coupling said second buffer means to said first bus.

4. The interface adaptor as recited in claim 1 wherein said interface adaptor includes a plurality of chip select inputs and said control means includes chip select means responsive to said chip select inputs for enabling said control means to produce said control signals.

5. A method of operating an interface adaptor comprising the steps of:
    generating a first select signal in response to a first logic level applied to a select input of said interface adaptor;
    selecting a first storage means of said interface adaptor in response to said first select signal;
    loading a first logic state into said first storage means from a data bus coupled to said interface adaptor;
    generating a second select signal in response to a second logic level applied to said select input;
    selecting a second storage means of said interface adaptor in response to a coincidence of said second select signal and said stored first logic state;
    loading a byte of direction control information from said data bus into said second storage means;
    generating a third select signal in response to another application of said first logic level to said select input;
    selecting said first storage means in response to said third select signal;
    loading a second logic state into said first storage means from said data bus;
    generating a fourth select signal in response to another application of said second logic level to said select output;
    selecting a buffer means of said interface adaptor coupled between said data bus and a peripheral data bus in response to a coincidence of said stored second logic state and said fourth select signal;
    enabling transferring of data from conductors of said data bus corresponding conductors of said peripheral data bus in response to corresponding bits of said byte which are at one logical state, and enabling transferring of data from the remaining conductors of said peripheral data bus to corresponding conductors of said data bus.

* * * * *